United States Patent
Sawa et al.

(10) Patent No.: US 11,417,449 B2
(45) Date of Patent: Aug. 16, 2022

(54) MAGNETIC SHEET AND NON-CONTACT POWER RECEIVING DEVICE, ELECTRONIC APPARATUS AND NON-CONTACT CHARGING SYSTEM USING THE SAME

(71) Applicants: Kabushiki Kaisha Toshiba, Tokyo (JP); Toshiba Materials Co., Ltd., Kanagawa (JP)

(72) Inventors: Takao Sawa, Yokohama (JP); Katsuhiko Yamada, Yokohama (JP); Tadao Saito, Yokohama (JP)

(73) Assignees: KABUSHIKI KAISHA TOSHIBA, Tokyo (JP); TOSHIBA MATERIALS CO., LTD., Yokohama (JP)

( * ) Notice: Subject to any disclaimer, the term of this patent is extended or adjusted under 35 U.S.C. 154(b) by 884 days.

(21) Appl. No.: 16/139,803

(22) Filed: Sep. 24, 2018

(65) Prior Publication Data
US 2019/0027285 A1 Jan. 24, 2019

Related U.S. Application Data

(63) Continuation of application No. 14/062,472, filed on Oct. 24, 2013, now Pat. No. 10,083,785, which is a (Continued)

(30) Foreign Application Priority Data

Apr. 25, 2011 (JP) .................................. 2011-097470

(51) Int. Cl.
*H02J 50/70* (2016.01)
*H01F 1/153* (2006.01)
(Continued)

(52) U.S. Cl.
CPC ......... *H01F 1/15308* (2013.01); *H01F 27/36* (2013.01); *H01F 27/366* (2020.08);
(Continued)

(58) Field of Classification Search
CPC ........ H01F 1/15308; H01F 7/36; H01F 38/14; H02J 50/10; H02J 50/70; H02J 50/90; H02J 7/00302; H02J 7/025
See application file for complete search history.

(56) References Cited

U.S. PATENT DOCUMENTS 5,912,622 A * 6/1999 Endo .................. B62H 5/20
340/572.5
6,103,405 A * 8/2000 Tomita ................ H01F 10/3218
428/800
(Continued)

FOREIGN PATENT DOCUMENTS

CN 102461360 A 5/2012
JP 09-190938 A 7/1997
(Continued)

OTHER PUBLICATIONS

"System Description Wireless Power Transfer", vol. 1: Low Power; Part 1; Interface Definition; Version 1.0.1, Oct. 2010.
(Continued)

*Primary Examiner* — Richard Isla
*Assistant Examiner* — Johali A Torres Ruiz
(74) *Attorney, Agent, or Firm* — Harness, Dickey & Pierce, P.L.C.

(57) ABSTRACT

A magnetic sheet 1 of an embodiment includes a stack of a plurality of magnetic thin strips and resin film parts. The stack includes from 5 to 25 pieces of the magnetic thin strips. The magnetic thin strips are provided with cutout portions each having a width of 1 mm or less (including 0 (zero)). A ratio (B/A) of a total length B of the cutout portions provided
(Continued)

to the magnetic thin strip to a total outer peripheral length A of an outer peripheral area of the magnetic thin strip arranged on one of the resin film parts is in a range of from 2 to 25.

12 Claims, 12 Drawing Sheets

Related U.S. Application Data continuation of application No. PCT/JP2012/002818, filed on Apr. 24, 2012.

(51) Int. Cl.
*H02J 50/10* (2016.01)
*H02J 50/90* (2016.01)
*H01F 38/14* (2006.01)
*H01F 27/36* (2006.01)

(52) U.S. Cl.
CPC .............. *H01F 38/14* (2013.01); *H02J 50/10* (2016.02); *H02J 50/70* (2016.02); *H02J 50/90* (2016.02)

(56) References Cited

U.S. PATENT DOCUMENTS

| | | | |
|---|---|---|---|
| 7,034,649 B2 * | 4/2006 | Asakura | C01G 53/006 252/62.59 |
| 2003/0134612 A1 | 7/2003 | Nakayama et al. | |
| 2006/0022886 A1 * | 2/2006 | Hein | H01F 1/153 343/787 |
| 2006/0214866 A1 * | 9/2006 | Araki | G04G 21/04 343/788 |
| 2009/0058358 A1 | 3/2009 | Inoue et al. | |
| 2009/0121677 A1 * | 5/2009 | Inoue | H01M 10/425 320/108 |
| 2009/0212637 A1 | 8/2009 | Baarman et al. | |
| 2009/0284341 A1 * | 11/2009 | Okada | H01F 38/14 336/232 |
| 2010/0156344 A1 * | 6/2010 | Inoue | H02J 50/12 320/108 |
| 2010/0310408 A1 | 12/2010 | Nagata et al. | |
| 2011/0210696 A1 | 9/2011 | Inoue | |
| 2011/0260681 A1 * | 10/2011 | Guccione | H02J 7/342 320/108 |

FOREIGN PATENT DOCUMENTS

| | | |
|---|---|---|
| JP | 11-265814 A | 9/1999 |
| JP | 2000-023393 A | 1/2000 |
| JP | 2008-112830 A | 5/2008 |
| WO | WO-2007/080820 A1 | 7/2007 |
| WO | WO-2007/111019 A1 | 10/2007 |
| WO | WO-2007/122788 A1 | 11/2007 |
| WO | WO-2009/025279 A1 | 2/2009 |
| WO | WO-2010/140367 A1 | 12/2010 |

OTHER PUBLICATIONS

International Search Report and Written Opinion in corresponding application PCT/JP2012/002818, dated Jul. 24, 2012, with English translation.

* cited by examiner

MAGNETIC SHEET AND NON-CONTACT POWER RECEIVING DEVICE, ELECTRONIC APPARATUS AND NON-CONTACT CHARGING SYSTEM USING THE SAME

CROSS-REFERENCE TO RELATED APPLICATIONS

This application is a continuation of U.S. patent application Ser. No. 14/062,472 filed on Oct. 24, 2013 (now U.S. Pat. No. 10,083,785 issued on Sep. 25, 2018), which is a continuation of prior International Application No. PCT/JP2012/002818 filed on Apr. 24, 2012, which is based upon and claims the benefit of priority from Japanese Patent Application No. 2011-097470 filed on Apr. 25, 2011, each of which are incorporated herein by reference in their entirety.

FIELD

Embodiments described herein relate generally to a magnetic sheet, and a non-contact power receiving device, an electronic apparatus and a non-contact charging system using the same.

BACKGROUND

In recent years, development of portable communication apparatuses is proceeding remarkably, and in particular, downsizing and thickness reduction of mobile phones are in rapid progress. Other than mobile phones, downsizing and thickness reduction are in progress also for electronic apparatuses such as video cameras (handy cameras or the like), cordless telephones, and laptop personal computers (notebook-sized personal computers). Provided with a secondary battery mounted on an electronic apparatus main body, they are structured to be usable without plugging to an outlet, thereby increasing portability and convenience. At the present time, the secondary battery has a limit in capacity, and needs to be charged once every few days or every few weeks.

As charging methods, there are a contact charging method and a non-contact charging method. The contact charging method is a method in which charging is performed by making an electrode of a power receiving device and an electrode of a power feeding device to be directly contacted with each other. The contact charging method is used in general because of its simple device structure. However, electronic apparatuses are becoming lighter in weight along with the downsizing and thickness reduction of electronic apparatuses in recent years, and accordingly, a problem arises such that a contact pressure between the electrode of the power receiving device and the electrode of the power feeding device becomes insufficient, resulting in that a charging failure is caused. Further, the secondary battery is vulnerable to heat, so that a circuit thereof has to be designed to avoid overdischarging and overcharging for preventing a temperature increase of the battery. From such points, application of non-contact charging method is considered.

The non-contact charging method is a method in which a coil is provided in each of the power receiving device and the power feeding device, and charging is performed by utilizing an electromagnetic induction. Since the non-contact charging method does not have to consider the contact pressure between the mutual electrodes, it is possible to stably supply a charging voltage without being affected by contact states of the mutual electrodes. As a coil for a non-contact charging system, a structure in which a coil is wound around a ferrite core, a structure in which a coil is mounted on a resin substrate in which ferrite powder or amorphous powder is mixed, and the like are known. However, ferrite becomes fragile when processed to be thin, so that it is poor in shock resistance, and there is a problem that a trouble easily occurs in the power receiving device due to dropping of the device or the like.

Further, for reducing a thickness of a power receiving portion by corresponding to thickness reduction of an apparatus, it is considered to adopt a flat coil formed by printing a metal powder paste in a spiral shape on a substrate. However, a magnetic flux passing through the flat coil is interlinked with a substrate or the like in the apparatus, and thus there is a problem that an eddy current generated due to an electromagnetic induction causes heat generation in the apparatus. Accordingly, large power cannot be transmitted, resulting in that a charging time becomes long. Concretely, it takes about 90 minutes in a contact charging system for charging a mobile phone, but, it takes about 120 minutes in a non-contact charging system for charging the mobile phone.

The power receiving device to which the conventional non-contact charging method is applied has insufficient countermeasures for the eddy current generated by the electromagnetic induction. The power receiving device includes the secondary battery, so that it is required to suppress the generation of heat as much as possible. Since the power receiving device is attached to the electronic apparatus main body, the generation of heat exerts an adverse effect on circuit components and the like. Due to the above, it is not possible to transmit large power at the time of charging, resulting in that the charging time becomes long. Further, the generation of eddy current leads to generation of noise, and becomes a factor of reducing a charging efficiency. As a countermeasure with respect to such a point, it is proposed to provide a magnetic thin strip at a predetermined position of the power receiving device. By controlling a magnetic permeability and a sheet thickness of the magnetic thin strip, or by controlling a saturation magnetic flux density and the sheet thickness of the magnetic thin strip, the heat generation, the generation of noise, the reduction in power receiving efficiency and the like caused by the eddy current are suppressed.

There is proposed a non-contact charging method in which a magnet is arranged on a power feeding side of a non-contact charging system, to thereby perform positioning of a device on a power receiving side. For example, in WPC (Wireless Power Consortium) being an international standard, a non-contact charging system that performs positioning with the use of a magnet is disclosed in "System Description Wireless Power Transfer volume I: Low Power Part 1: interface Definition version 1.0 July 2010".

When the positioning is performed with the use of the magnet, a magnetic saturation is caused in the conventional magnetic thin strip, resulting in that a magnetic shielding effect is drastically reduced. For this reason, there is a concern that a temperature increase of a secondary battery is caused at the time of charging, and a cycle life of the secondary battery is reduced. A conventional magnetic shield has a magnetic thin strip whose saturation magnetic flux density is 0.55 to 2 T (5.5 to 20 kG), for example, and is formed of one piece of such a magnetic thin strip or stacked magnetic thin strips as above whose number is in a range of 3 or less. Even if a stack of the magnetic thin strips is used as the magnetic shield, there is a possibility that the magnetic shield easily causes a magnetic saturation due to a magnetic field generated from the magnet arranged on the power feeding device, resulting in that a function as the magnetic shield cannot be exhibited.

DETAILED DESCRIPTION

According to one embodiment, there is provided a magnetic sheet including a stack of a plurality of magnetic thin strips and resin film parts. The stack includes the magnetic thin strips which are stacked and whose number is from 5 to 25. The magnetic thin strips are provided with cutout portions each having a width of 1 mm or less (including 0 (zero)). A ratio (B/A) of a total length B of the cutout portions to a total outer peripheral length A of the magnetic thin strip is in a range of from 2 to 25. The total outer peripheral length A is a total length of an outer peripheral area of the magnetic thin strip arranged on one of the resin film parts, and the total length B of the cutout portions is a total length of the cutout portions provided to the magnetic thin strip arranged on one of the resin film parts.

Figure 1:
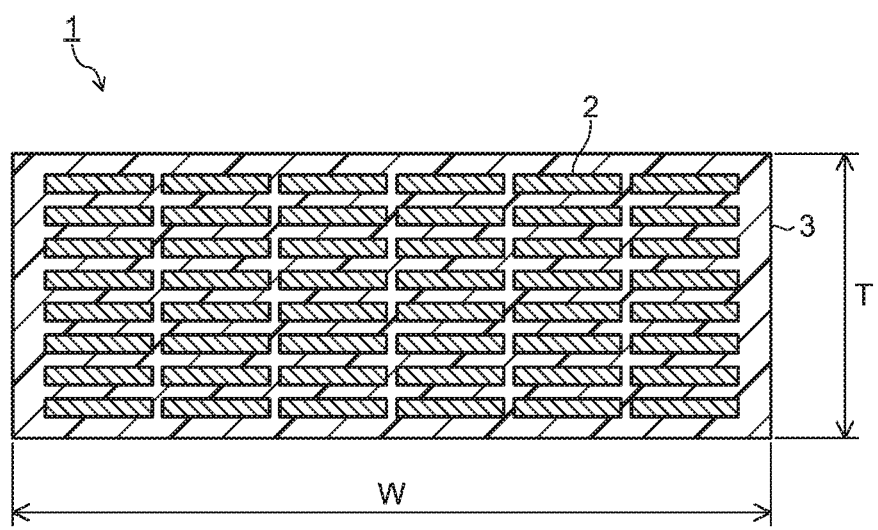
FIG. 1 is a sectional diagram illustrating a magnetic sheet of an embodiment.

Hereinafter, explanation will be made on a magnetic sheet of an embodiment, a non-contact power receiving device, an electronic apparatus and a non-contact charging system using the same. FIG. 1 is a sectional diagram illustrating a magnetic sheet according to an embodiment. In FIG. 1, 1 denotes a magnetic sheet, 2 denotes a magnetic thin strip, and 3 denotes a resin film part. A structure in which the magnetic thin strips 2 and the resin film parts 3 are stacked, indicates a structure in which a plurality of the magnetic thin strips 2 are stacked with respect to a thickness T of the magnetic sheet 1, as illustrated in FIG. 1. The magnetic thin strips 2 whose number is in a range of 5 to 25 are stacked with respect to the thickness T of the magnetic sheet 1. When the stacked number of the magnetic thin strips 2 is 4 or less, a magnetic saturation is caused by a magnet arranged on a power feeding device, resulting in that a shielding effect cannot be obtained. When the stacked number of the magnetic thin strips 2 exceeds 25, the thickness T of the magnetic sheet 1 is unnecessarily increased, and thus the sheet may not be able to be mounted on a power receiving device or an electronic apparatus. The thickness T of the magnetic sheet 1 is preferably in a range of 0.1 to 1 mm.

The magnetic sheet 1 preferably includes one or more of the magnetic thin strip 2 whose sheet thickness is from 5 to 30 μm. When the sheet thickness of the magnetic thin strip 2 is less than 5 μm, it is difficult to produce the strip with a roll quenching method or the like, which becomes a factor of increasing cost. When the sheet thickness of the magnetic thin strip 2 exceeds 30 μm, an L value under 100 kHz or more is lowered. It is more preferable that each of the plurality of magnetic thin strips 2 forming the magnetic sheet 1 has the sheet thickness in a range of 5 to 30 μm. A more preferable sheet thickness of the magnetic thin strip 2 is in a range of 10 to 25 μm.

As the resin film part 3, a resin which is previously processed in a film shape, a resin film formed by solidifying an adhesive resin in a film shape, a resin film provided with an adhesive layer, or the like can be cited. The resin film parts 3 preferably have a shape of covering the entire magnetic thin strips 2 so that the magnetic thin strips 2 are not exposed. As will be described later, when an Fe-based amorphous alloy thin strip is used as the magnetic thin strip 2, it is preferable to cover the entire magnetic thin strips 2 with the resin film parts 3 also for the purpose of preventing rust. Further, by covering the entire magnetic thin strips 2 with the resin film parts 3, the strength of the magnetic sheet 1 is improved, and handleability of the magnetic sheet 1 can be enhanced.

As the resin film part 3, a polyethylene terephthalate (PET) film, a polyimide film, a polyester film, a polyphenylene sulfide (PPS) film, a polypropylene (PP) film, a polytetrafluoroethylene (PTFE) film, or the like can be used. When the resin film part 3 is formed of an adhesive resin, an epoxy-based adhesive, a silicone-based adhesive, an acryl-based tackiness agent, or the like can be cited as the adhesive.

It is preferable that the magnetic thin strip 2 and the resin film part 3 are alternately stacked. When the magnetic thin strips 2 whose number is in a range of 5 to 25 are stacked, it is preferable that the respective magnetic thin strips 2 and the respective resin film parts 3 are alternately stacked. When the magnetic sheet 1 has a structure in which the respective magnetic thin strips 2 and the respective resin film parts 3 are alternately stacked, it is possible to securely fix the magnetic thin strips 2. Further, a width of cutout portion to be described later is easily adjusted to be 1 mm or less.

The magnetic sheet 1 preferably includes one or more of the magnetic thin strip 2 whose saturation magnetostriction constant is 15 ppm or more. When the saturation magnetostriction constant of the magnetic thin strip 2 is 15 ppm or more, a magnetic anisotropy is generated due to an interaction with a quenching strain introduced at a time of producing an amorphous alloy thin strip, for example, and this effect suppresses a magnetic saturation caused by a magnetic field provided by an adjacent magnet. Specifically, it is possible to more effectively secure a necessary L value. When the saturation magnetostriction constant of the magnetic thin strip 2 is less than 15 ppm, the magnetic saturation easily occurs when the power feeding device has the magnet, resulting in that the L value becomes small. An upper limit of the saturation magnetostriction constant is not particularly limited, but, it is preferably 50 ppm or less from a point of view of manufacturability.

The saturation magnetostriction constant is adjusted through a control of composition and the strain at the time of quenching based on the roll quenching method, for example. When the saturation magnetostriction constant is increased, it becomes difficult to cause the magnetic saturation in the magnetic thin strip 2. As a method of increasing the saturation magnetostriction constant of the magnetic thin strip 2, when an Fe-based amorphous alloy is used, there can be cited a method of increasing a saturation magnetic flux density, a method of adding a slight amount of rare-earth element, or the like. In the latter method, if the added amount is increased too much, it becomes difficult to apply the roll quenching method in the atmosphere, which becomes a factor of increasing manufacturing cost of the magnetic thin strip 2. Therefore, the saturation magnetostriction constant of the magnetic thin strip 2 is preferably in a range of 15 to 50 ppm, more preferably in a range of 20 to 50 ppm, and still more preferably in a range of 25 to 35 ppm. It is more preferable that each of the plurality of magnetic thin strips 2 forming the magnetic sheet 1 has the saturation magnetostriction constant of 15 ppm or more.

The magnetic sheet 1 preferably includes one or more of the magnetic thin strip 2 whose saturation magnetic flux density is not less than 1.2 T (12 kG) nor more than 2.1 T (21 kG). When the saturation magnetic flux density of the magnetic thin strip 2 is less than 1.2 T, the magnetic saturation easily occurs when the power feeding device has the magnet. When the saturation magnetic flux density of the magnetic thin strip 2 exceeds 2.1 T, it becomes difficult to form an amorphous phase, and it becomes difficult to control the saturation magnetostriction constant, the sheet thickness and the like. The saturation magnetic flux density of the magnetic thin strip 2 is more preferably not less than 1.3 T nor more than 2.0 T. It is still more preferable that each of the plurality of magnetic thin strips 2 forming the magnetic sheet 1 has the saturation magnetic flux density of 1.2 to 2.1 T.

It is preferable that the magnetic thin strips 2 include one or more of amorphous alloy thin strip having a composition represented by a general formula:

$$Fe_{100-a-b-c}M_aX_bT_c \qquad (1)$$

where, M is at least one element selected from the group consisting of Ni and Co, T is at least one element selected from the group consisting of Mn, Cr, Ti, Zr, Hf, Mo, V, Nb, W, Ta, Cu, Sn and rare-earth elements, X is at least one element selected from the group consisting of B, Si, C and P, a is a number satisfying $0 \leq a \leq 25$ atom %, b is a number satisfying $10 \leq b \leq 35$ atom %, and c is a number satisfying $0 \leq c \leq 5$ atom %.

In the formula (1), the element M is used for satisfying the characteristics such as the saturation magnetic flux density and the saturation magnetostriction constant. The element T is added for improving a thermal stability, a corrosion resistance, an inductance value under a quenched state and the like. It is preferable to select Co as the element M, since the saturation magnetostriction constant and the saturation magnetic flux density are increased. An added amount a of the element M is preferably 25 atom % or less. When the added amount exceeds 25 atom %, the saturation magnetic flux density and the saturation magnetostriction constant are lowered. An added amount c of the element T is preferably 5 atom % or less. When the added amount c exceeds 5 atom %, the saturation magnetic flux density and the saturation magnetostriction constant are lowered, resulting in that the necessary characteristic (inductance) under the quenched state cannot be obtained.

The element X is an element essential for obtaining an amorphous phase. B (boron) and P (phosphorus) can turn a magnetic alloy into amorphous by themselves, and B, in particular, is preferable in terms of thermal stability and mechanical properties. Si (silicon) and C (carbon) are elements effective for encouraging formation of amorphous phase or for increasing a crystallization temperature, namely, they are effective for stabilizing the amorphous phase. When a content of the element X is too large, the saturation magnetic flux density and the saturation magnetostriction constant are easily lowered. When the content of the element X is too small, turning to amorphous becomes difficult, and a magnetic permeability of the amorphous alloy thin strip is lowered. From these points, it is preferable that the content of the element X is in a range of 10 to 35 atom %. It is more preferable that the content of the element X is set to fall within a range of 12 to 30 atom %.

From a point of view of rust prevention effect, it is preferable to use P and Cr at the same time. When the magnetic thin strip 2 having the rust prevention effect is used, there is no need to completely cover up to an end portion of the magnetic thin strip 2 with the resin film part 3. Over the long term, there is a possibility of permeation of moisture, depending on the material of the resin film part 3. For this reason, it is effective to use an amorphous magnetic thin strip having the rust prevention effect. The amorphous alloy thin strip preferably has an Fe-rich composition in which the value of (100-a-b-c) in the formula (1) is 50 or more.

The amorphous alloy thin strip used as the magnetic thin strip 2 can be produced by, for example, a roll quenching method (molten metal quenching method). Concretely, an alloy material adjusted to have a predetermined composition ratio is melted, the alloy molten metal is jetted to a surface of chill roll rotating at high speed, and the resultant is quenched, thereby producing the amorphous alloy thin strip used as the magnetic thin strip 2.

The magnetic sheet 1 preferably includes one or more of the magnetic thin strip 2 which is not broken when being subjected to 180° adhesion bending. By using the magnetic thin strip 2 which is not broken when being subjected to the adhesion bending, it is possible to produce the magnetic sheet 1 having the flexibility. The magnetic sheet 1 having the flexibility can be arranged in a curved state or in a bent state with respect to a later-described power receiving device, so that the usability of the magnetic sheet 1 is improved. As such a magnetic thin strip 2, one corresponding to the amorphous alloy thin strip having the composition represented by the formula (1) which is not subjected to heat treatment, can be cited.

By performing the heat treatment on the amorphous alloy thin strip, it is possible to adjust the magnetic properties such as the magnetostriction constant. However, when the heat treatment at 350° C. or more is conducted, a micro crystal arrangement is generated in the thin strip, resulting in that the thin strip becomes fragile, and a quenching strain introduced at the time of producing the thin strip is easily alleviated. Accordingly, when the magnet is adjacently disposed, the magnetic saturation easily occurs. The inductance value to be obtained becomes small, and the magnetic shielding effect is lowered. Further, when the magnetic thin strip 2 is easily broken, breakage easily occurs when the strip is used as the magnetic sheet 1. When the magnetic thin strip 2 is broken, an amount of cutout portions is changed, resulting in that a B/A ratio to be described later in detail may exceed 25.

The magnetic sheet 1 preferably has a structure in which 5 to 25 pieces of amorphous alloy thin strips are stacked. Note that it is also possible to use Co-based amorphous alloy thin strips or Fe-based microcrystalline alloy thin strips (average crystal grain diameter of 10 to 50 nm) having a saturation magnetostriction constant of almost zero and whose number corresponds to one being 20% or less of the total stacked number. In this case, it is preferable to arrange the magnetic sheet at a position separated from a position of the magnet of the power feeding device. The magnetic thin strip whose saturation magnetostriction constant is almost zero may not have cutout portions.

Figure 2:
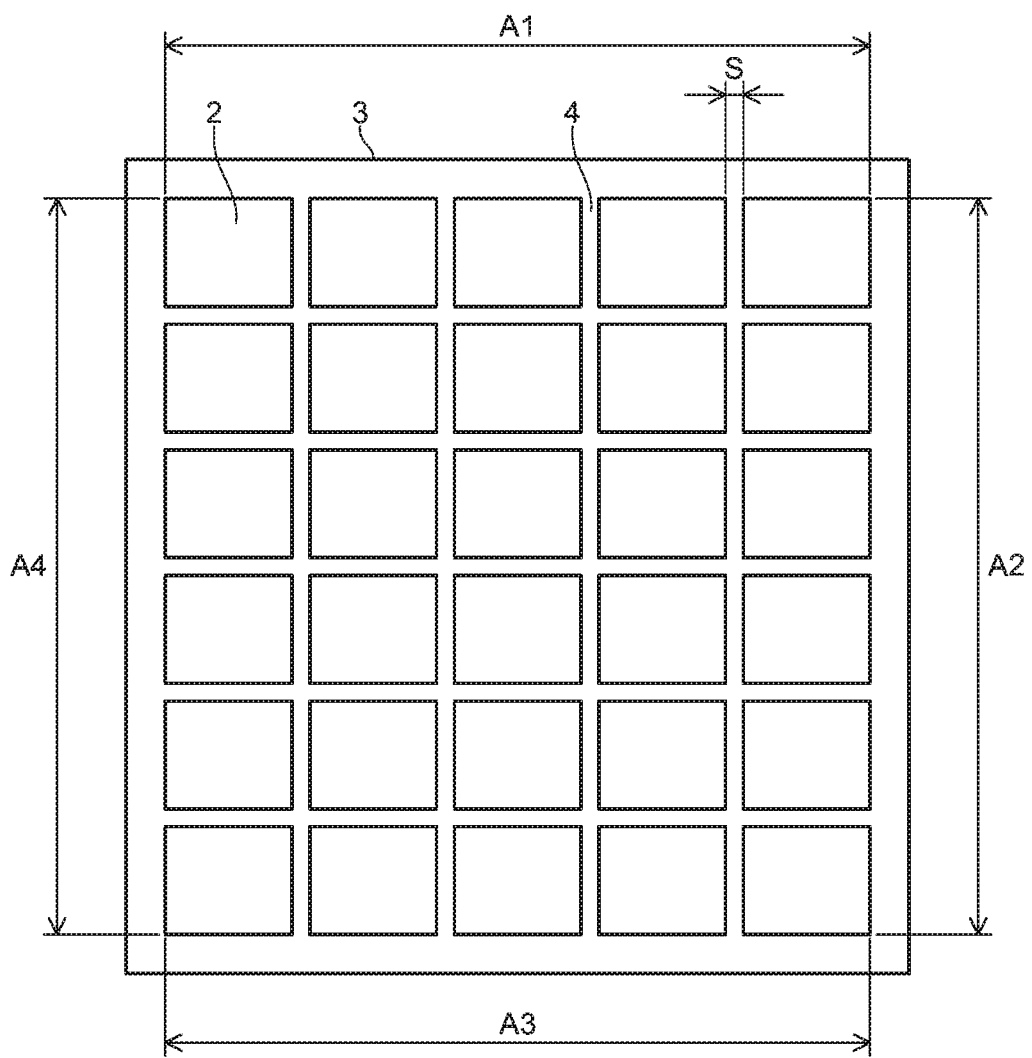
FIG. 2 is a plan view illustrating a first example of cutout portions of magnetic thin strips and an example of measurement of an outer peripheral length A of the magnetic thin strips in the magnetic sheet of the embodiment.

In the magnetic sheet 1 having the stack of the magnetic thin strips 2 and the resin film parts 3, the magnetic thin strips 2 are provided with cutout portions each having a width of 1 mm or less (including 0 (zero)). FIG. 2 illustrates a first example of the magnetic thin strips 2 arranged on one of the resin film parts 3. In FIG. 2 to FIG. 9, 2 denotes the magnetic thin strip, 3 denotes the resin film part, and 4 denotes the cutout portion. S indicates a width of the cutout portion 4. A shape of the cutout portion 4 may be either a shape of separating the mutual magnetic thin strips 2 illustrated in FIG. 2 or a slit shape of cutting a part of the magnetic thin strip 2 illustrated in FIG. 4.

FIG. 2 illustrates a state where a gap is provided between the magnetic thin strips 2 for easier understanding, but, the adjacent magnetic thin strips 2 may also be arranged by being contacted with each other (the width S of the cutout portion 4: 0 (zero) mm). When there is a portion in which the width S exceeds 1 mm, such a cutout portion 4 preferably occupies 10% or less of the total, and it is more preferable that all of the widths S are 1 mm or less (including 0 (zero)). When the width S of the cutout portion 4 is too large, the magnetic shielding effect provided by the magnetic sheet 1 is lowered, which increases an eddy current generated in a surface of case of a secondary battery, for example. As a result of this, an adverse effect is exerted on battery characteristics. The width S of the cutout portion 4 is preferably 0.5 mm or less. The cutout portion 4 preferably has a shape of penetrating from a front surface to a rear surface of the magnetic thin strip 2, and accordingly, it is possible to obtain a high Q value. For example, if the cutout which does not penetrate such as a recession or a groove is provided, it is not possible to obtain sufficient characteristics. The cutout portion 4 in this embodiment does not include a cutout which does not penetrate such as a recession or a groove.

In the magnetic sheet 1 of the embodiment, a ratio (B/A) of a total length B of the cutout portions 4 provided to the magnetic thin strip 2 to a total outer peripheral length A of an outer peripheral area of the magnetic thin strip 2 arranged on one of the resin film parts 3 is set to fall within a range of not less than 2 nor more than 25. The total outer peripheral length A of the outer peripheral area of the magnetic thin strip 2 is an outermost peripheral length of the magnetic thin strip 2 (regardless of a case where the strip is divided and a case where the strip is not divided) arranged on a certain surface of the magnetic sheet 1. The total outer peripheral length A of the outer peripheral area of the magnetic thin strip 2 can be determined from "A1+A2+A3+ A4" as illustrated in FIG. 2. Although FIG. 2 illustrates an example of arranging the magnetic thin strips 2 in a quadrangular shape, also in another shape, a length of outer periphery is similarly set to the outer peripheral length A. The width of the cutout portion 4 to be a gap between the magnetic thin strips 2 is small to be 1 mm or less, so that the total outer peripheral length A of the outer peripheral area of the magnetic thin strip 2 is set to be determined by the above-described way of determination.

Figure 3:
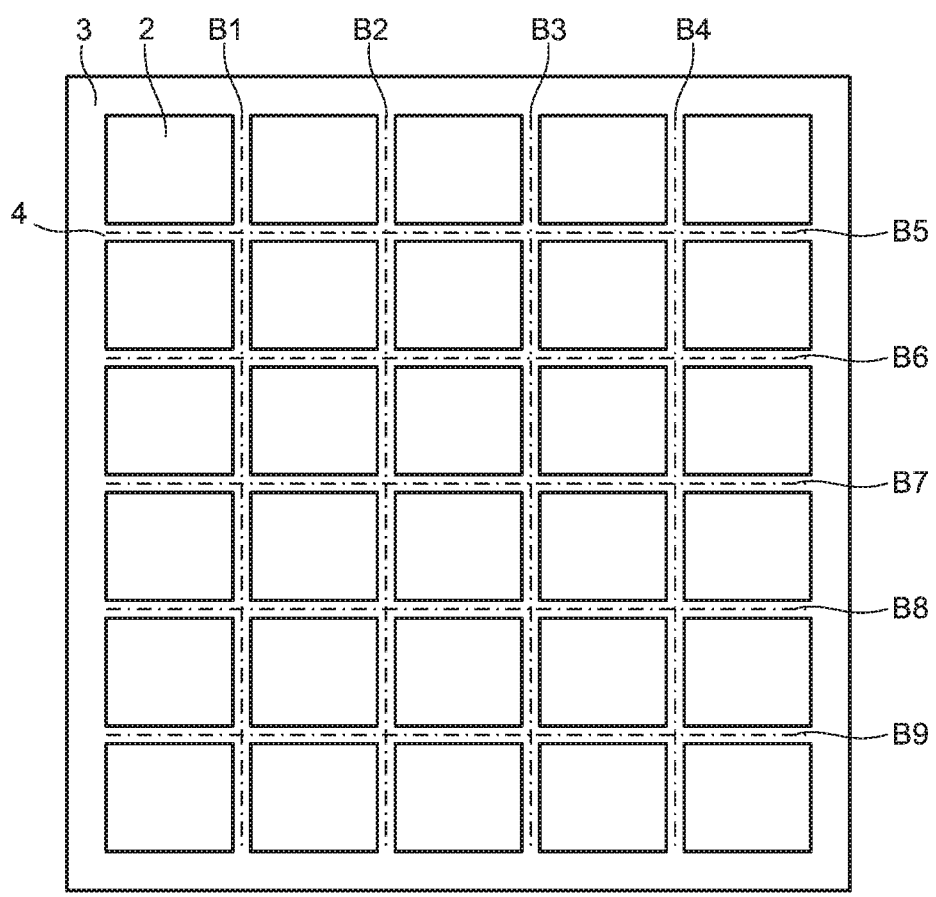
FIG. 3 is a plan view illustrating an example of measurement of a total length B of the cutout portions of the magnetic thin strips in the magnetic sheet of the embodiment.
Figure 4:
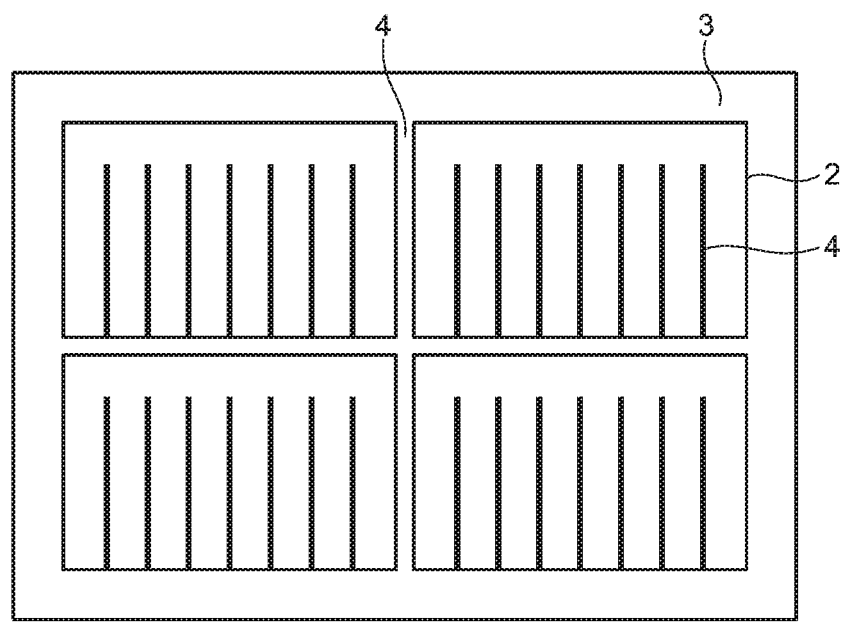
FIG. 4 is a plan view illustrating a second example of cutout portions of the magnetic thin strips in the magnetic sheet of the embodiment.

FIG. 3 illustrates a way of determination of the total length B of the cutout portions 4 provided to the magnetic thin strips 2. When all of the widths of the cutout portions 4 illustrated in FIG. 3 are 1 mm or less, the total length B of the cutout portions 4 can be determined from "B1+B2+B3+ B4+B5+B6+B7+B8+B9". Tentatively, when each of widths of B1 to B8 is 0.5 mm, and a width of B9 is 2 mm, the total length B of the cutout portions 4 becomes "B1+B2+B3+ B4+B5+B6+B7+B8". When there are provided the gap-shaped cutout portions 4 separating between the magnetic thin strips 2 and the slit-shaped cutout portions 4 formed on the magnetic thin strips 2 themselves, as illustrated in FIG. 4, the total length of the cutout portions 4 whose width S is 1 mm or less (including 0 (zero)) among the gaps and the slits, is set to B. The slit penetrates from the front surface to the rear surface.

As illustrated in FIG. 4, the magnetic thin strip 2 having the slit-shaped cutout portions 4 is good in handleability. With the use of the cutout portion 4 formed by arranging the magnetic thin strips 2 with a gap provided therebetween, the width S is easily adjusted to be in a range of 0 (zero) to 1 mm. When a single magnetic thin strip 2 is divided into a plurality of pieces to be used, a size of one piece is preferably 0.5 mm×0.5 mm or more. When a length of one side of the magnetic thin strip 2 is less than 0.5 mm, the handleability is poor, and it is difficult to arrange the strips to make the width S of the cutout portions 4 to be in a range of 0 (zero) to 1 mm. Although not illustrated, it is also possible to arrange a single magnetic thin strip 2 on the entire surface of the resin film part 3, and to provide a large number of slits on the magnetic thin strip 2. The shape of the cutout portion 4 is not limited to a linear shape, and it may also be a curved shape or a zigzag shape.

Figure 5:
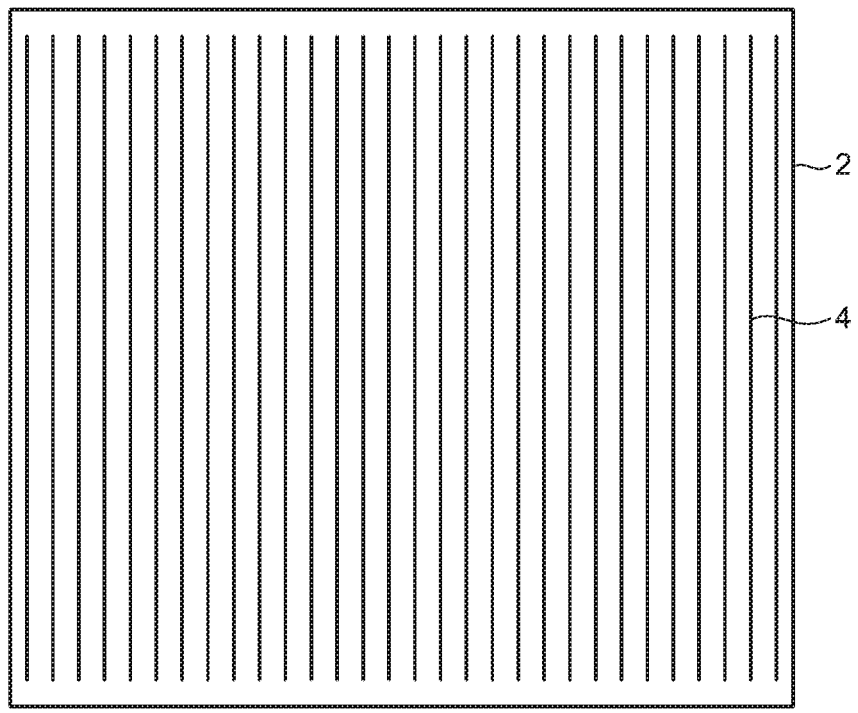
FIG. 5 is a plan view illustrating a third example of cutout portions of the magnetic thin strip in the magnetic sheet of the embodiment.

Other examples of the cutout portions are illustrated in FIG. 5 to FIG. 9. FIG. 5 illustrates an example in which a plurality of slits (cutout portions 4) are provided to a single magnetic thin strip 2. FIG. 5 illustrates an example in which the slits (cutout portions 4) are not formed up to an end portion of the magnetic thin strip 2. In this case, it is possible to provide all of the cutout portions 4 to the single magnetic thin strip 2, so that it is only required to put the magnetic thin strip 2 on the resin film part 3. Therefore, it is easy to form a stack of the magnetic thin strips 2 and the resin film parts 3.

Figure 6:
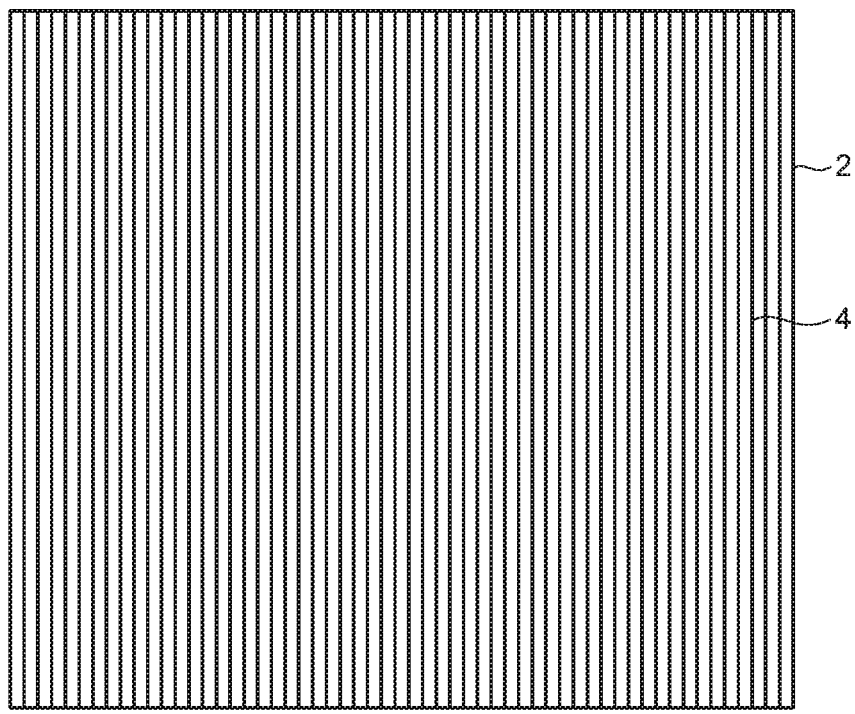
FIG. 6 is a plan view illustrating a fourth example of cutout portions of the magnetic thin strip in the magnetic sheet of the embodiment.
Figure 7:
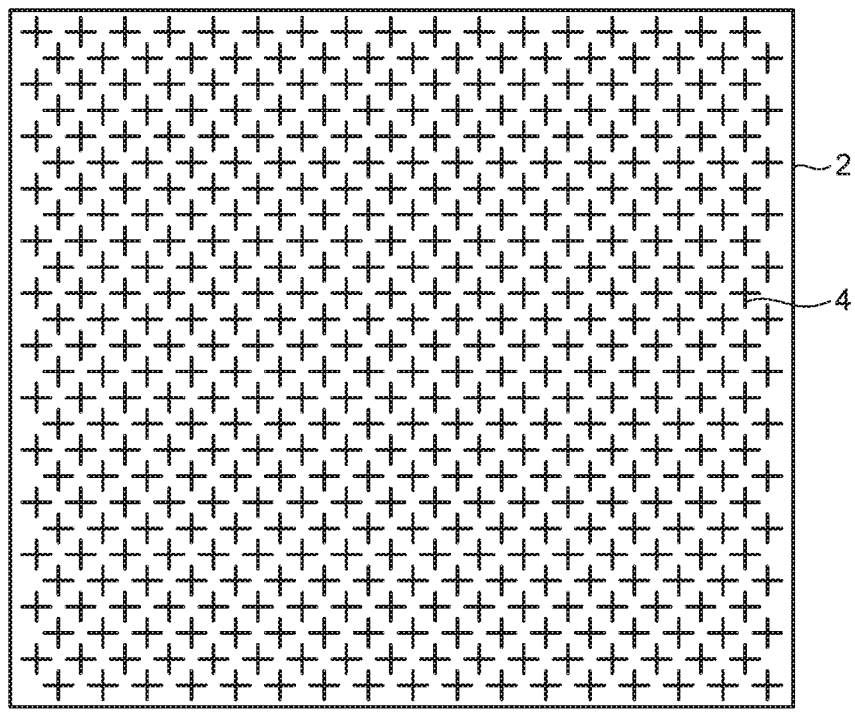
FIG. 7 is a plan view illustrating a fifth example of cutout portions of the magnetic thin strip in the magnetic sheet of the embodiment.

FIG. 6 illustrates an example in which a plurality of slits (cutout portions 4) are provided from one end portion of the magnetic thin strip 2 to an end portion on the opposite side. In this case, the magnetic thin strip 2 before the cutout portions 4 are formed thereon is previously attached to the resin film part 3, and then a slitting process is performed on the magnetic thin strip 2, which enables to form a large number of cutout portions 4 with a certain width S at a time, and thus the cutout portions 4 are easily formed. FIG. 7 illustrates an example in which a large number of cutout portions 4 in a cross shape are provided to the magnetic thin strip 2. The shape of the cutout portion 4 is not limited to a linear shape such as one illustrated in FIG. 5 and FIG. 6, and it may also be a cross shape such as one illustrated in FIG. 7. The cutout portions 4 in the cross shape can be formed by an etching method.

Figure 8:
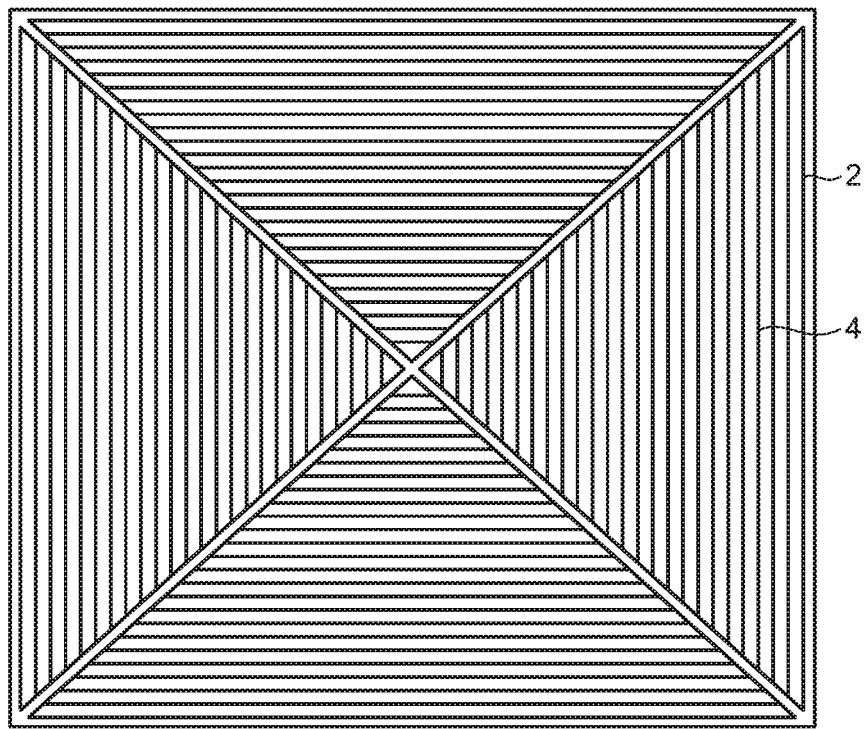
FIG. 8 is a plan view illustrating a sixth example of cutout portions of the magnetic thin strips in the magnetic sheet of the embodiment.
Figure 9:
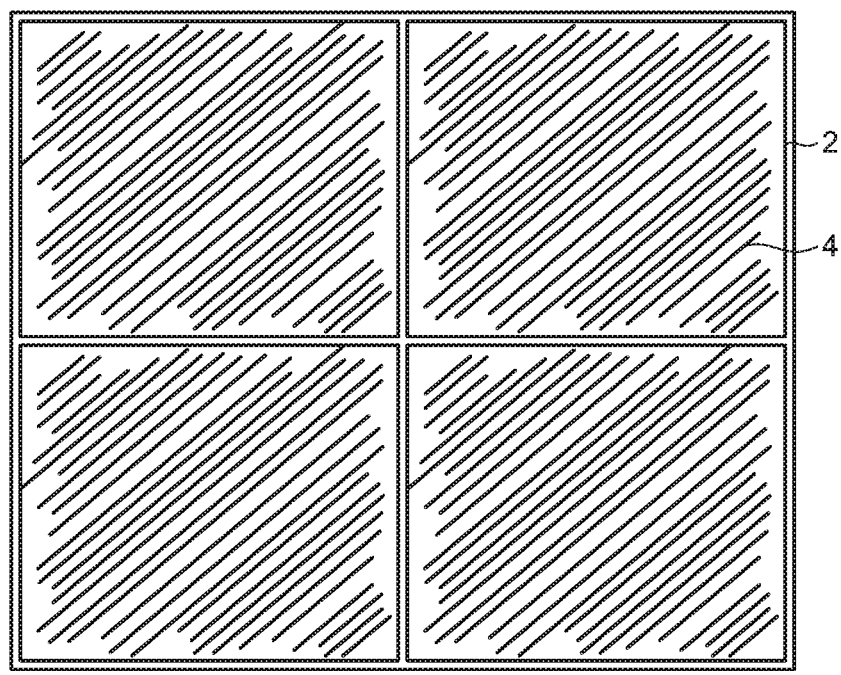
FIG. 9 is a plan view illustrating a seventh example of cutout portions of the magnetic thin strips in the magnetic sheet of the embodiment.

FIG. 5 to FIG. 7 illustrate examples in which the plurality of cutout portions 4 are provided to the single magnetic thin strip 2. FIG. 4 illustrates the example in which the plurality of magnetic thin strips 2 provided with the cutout portions 4 are arranged on the resin film part 3, but, other than that, shapes as illustrated in FIG. 8 and FIG. 9 may also be employed. FIG. 8 illustrates an example in which four triangular magnetic thin strips 2 provided with a plurality of slits (cutout portions 4) are used and arranged in a quadrangular shape. With the use of a structure in which a plurality of magnetic thin strips 2 are arranged on one of the resin film parts 3, the width S of the cutout portion 4 can be controlled by both of a slit width and a gap between adjacent magnetic thin strips 2. FIG. 9 illustrates an example in which oblique slits (cutout portions 4) are provided to the magnetic thin strips 2. The slits may also be obliquely formed.

Although a method of forming the cutout portions 4 is not particularly limited, there can be cited, for example, a method of cutting a long magnetic thin strip in a desired size by a cutting blade, a method of forming the slits through etching, a method of forming the slits through laser machining, and the like. The cutout portions 4 can also be formed by combining these methods. It is also possible that the magnetic thin strip 2 is arranged on the resin film part 3 and then the cutout portions 4 are formed on the strip, or the magnetic thin strip 2 on which the cutout portions 4 are previously formed is arranged on the resin film part 3. The cutout portions 4 may be uniformly formed on the entire magnetic thin strip 2, or they may also be formed in a state of density unevenness in which they are densely formed in the vicinity of a center of the magnetic thin strip 2, for example. In the stacked structure, the shapes of the cutout portions 4 formed on the individual magnetic thin strips 2 may be different.

In the magnetic sheet 1 of this embodiment, the B/A ratio is controlled to fall within a range of 2 to 25, so that the L value and the Q value of the magnetic sheet 1 can be improved. For example, it is possible to obtain a magnetic sheet whose L value is 11 µH or more and whose Q value is 10 or more under 125 kHz. When the B/A ratio is less than 2, the Q value is not improved, and when the B/A ratio exceeds 25, the L value is lowered. When the B/A ratio is less than 2, it is not possible to suppress the generation of eddy current, and when the B/A ratio exceeds 25, the power receiving efficiency is reduced. The reduction in power receiving efficiency becomes a factor of increasing a charging time. When the magnetic sheet 1 has a stacked structure in which the respective magnetic thin strips 2 and the respective resin film parts 3 are alternately stacked, the B/A ratio on each resin film part 3 is preferably set to fall within a range of 2 to 25. It is also possible that all of the B/A ratios on the respective resin film parts 3 are the same, or the B/A ratios are changed for the respective resin film parts.

In the non-contact charging system, a resonant circuit is applied to the power receiving device (electronic apparatus to be charged) for enhancing the power receiving efficiency. The resonant circuit configured by connecting L (inductor) and C (capacitor) in series or in parallel, maximizes or minimizes a current that flows through the circuit in a specific resonant frequency. As an important characteristic for obtaining a quality factor (frequency selectivity) of the resonant circuit, there is a Q value of resonance. The Q value is represented by $Q=2\pi fL/R$. $\pi$ denotes a circle ratio of 3.14, f denotes a frequency, L denotes an L value (inductance), and R denotes a loss. In order to increase the Q value, the frequency f is increased, L is increased, and the loss R is reduced. The frequency f can be increased by a circuit design, but, when the frequency f is increased, an eddy current loss is increased, resulting in that the loss R is increased.

Accordingly, in this embodiment, by using the magnetic sheet 1 having the magnetic thin strips 2 on which the predetermined amount of cutout portions 4 (B/A is 2 to 25) are formed, the increase in the eddy current loss is prevented. The eddy current corresponds to a ring current excited in a conductor by an electromagnetic induction when a magnitude of magnetic field applied to the conductor is changed, and a loss generated according thereto is the eddy current loss. Since the electromagnetic induction occurs, when the eddy current is increased, heat is generated. For example, in a power receiving device on which a secondary battery is mounted, heat generation occurs in a case of the secondary battery due to the eddy current, resulting in that a charging/discharging cycle life is shortened or a deterioration of discharge capacity is facilitated. The excessive generation of heat also becomes a cause of trouble of the electronic device.

In order to suppress the generation of eddy current, there is a need to increase the magnetic shielding effect of the magnetic sheet 1. When a strain is introduced into the magnetic thin strip 2 having a high magnetostriction, and such magnetic thin strips whose number is in a range of 5 to 25 are stacked, no magnetic saturation occurs even in a state where an external magnetic field exists, and high L can be obtained. Therefore, an excellent magnetic shielding effect can be achieved. It is effective to form the cutout portions 4 on the magnetic thin strips 2 in a manner as described above. By setting the width S of the cutout portions 4 to be small to be 0 (zero) to 1 mm or less, a magnetic flux passes through a gap between the magnetic thin strips 2, resulting in that the generation of eddy current in a surface of case of a secondary battery or the like can be prevented.

Figure 10:
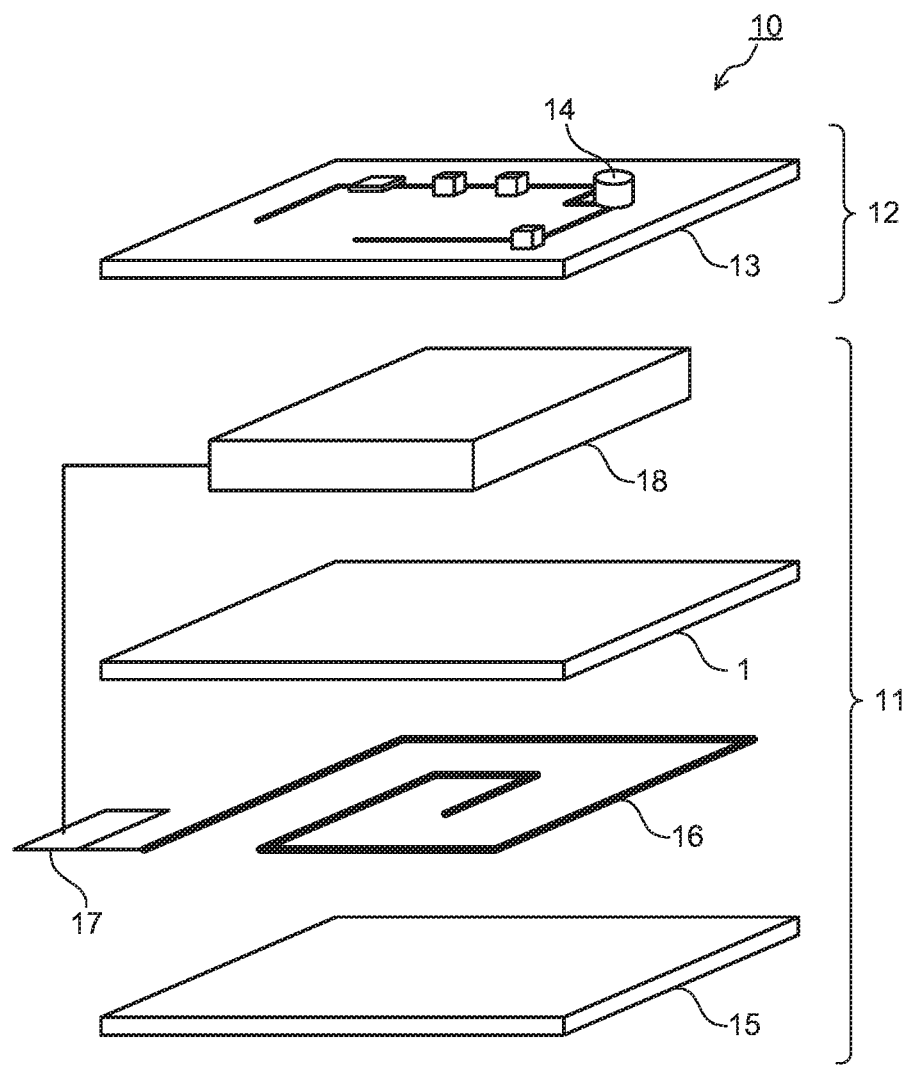
FIG. 10 is a diagram illustrating a schematic configuration of an electronic apparatus according to a first embodiment.
Figure 11:
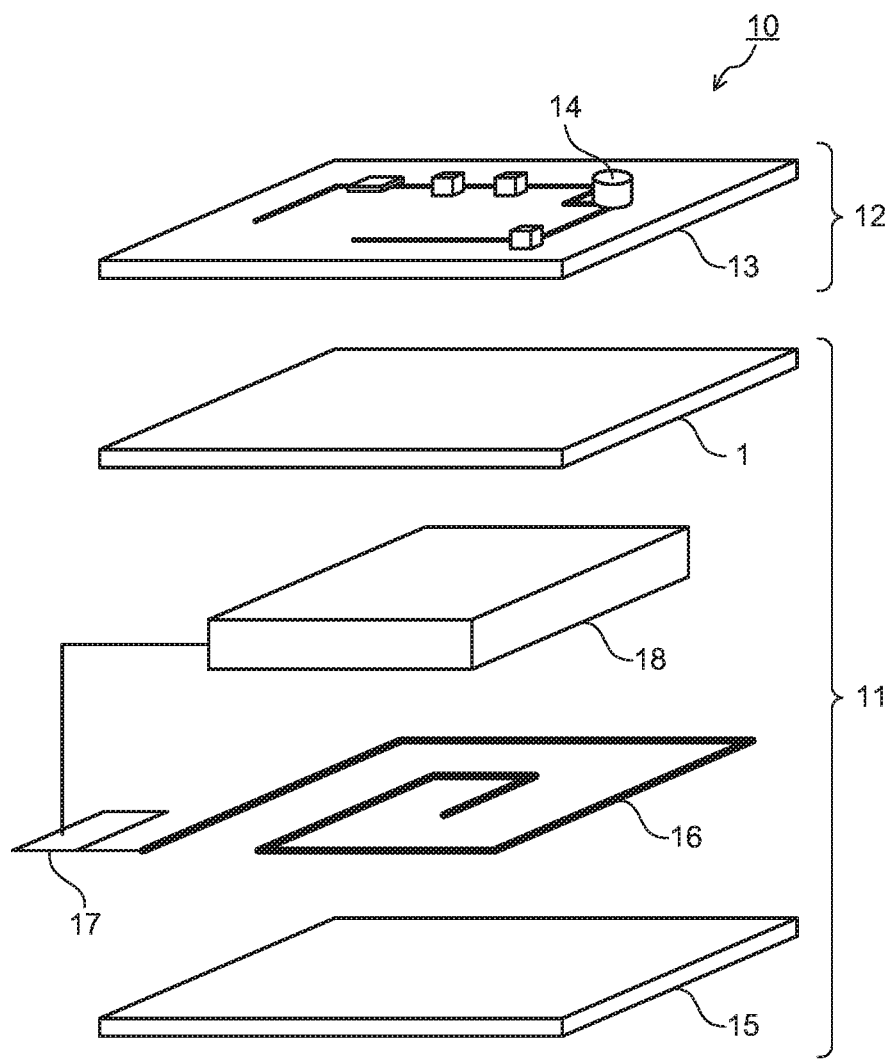
FIG. 11 is a diagram illustrating a schematic configuration of an electronic apparatus according to a second embodiment.

Next, explanation will be made on a power receiving device, an electronic apparatus and a non-contact charging system of embodiments. FIG. 10 and FIG. 11 illustrate a configuration of an electronic apparatus according to each of first and second embodiments. An electronic apparatus 10 illustrated in FIG. 10 and FIG. 11 includes a power receiving device 11 and an electronic apparatus main body 12, to which a non-contact charging method is applied. The main body 12 includes a circuit board 13 and an electronic device 14 mounted on the circuit board 13. The power receiving device 11 and the electronic apparatus main body 12 are arranged in a housing 15, and they configure the electronic apparatus 10.

The power receiving device 11 includes a power receiving coil 16 having a spiral coil, a rectifier 17 rectifying an alternating voltage generated in the power receiving coil 16, and a secondary battery 18 to which a direct-current voltage rectified by the rectifier 17 is charged. The electronic apparatus main body 12 includes the electronic device 14 which is supplied with the direct-current voltage charged in the secondary battery 18 of the power receiving device 11 for operation. Other than the electronic device 14 and the circuit board 13, the electronic apparatus main body 12 may include a part, a device or the like according to the function, operation, or the like of the electronic apparatus 10.

As the spiral coil forming the power receiving coil 16, a flat coil made by winding a metal wire such as a copper wire in a flat state, a flat coil formed by printing a metal powder paste in a spiral shape, or the like is used. The winding shape of the spiral coil is not particularly limited, and may be a circle shape, an elliptic shape, a quadrangle, a polygon, or the like. The number of times of winding the spiral coil is appropriately set according to required characteristics.

As the rectifier 17, a semiconductor element such as a transistor and a diode can be cited. The number of the rectifiers 17 is arbitrary, and one or two or more of the rectifiers 17 are used as necessary. The rectifier 17 may be formed by a film forming technology such as TFT. In FIG. 10 and FIG. 11, the rectifier 17 is disposed on the side of the power receiving coil 16 of the circuit board 13. The rectifier 17 may also be provided on the surface opposite to the power receiving coil 16 of the circuit board 13. The secondary battery 18 is one capable of charging/discharging, for which ones with various shapes such as a flat shape and a button shape can be used.

The electronic device 14 includes various types of elements and parts configuring the circuit such as a resistor element, a capacitor element, an inductance element, a control element, and a storage element. Further, there may be parts or devices other than them. The circuit board 13 is obtained by forming a circuit on a surface of or inside an insulating substrate such as a resin substrate and a ceramic substrate. The electronic device 14 is mounted on the circuit board 13. The electronic device 14 may include one that is not mounted on the circuit board 13.

As illustrated in FIG. 10, the electronic apparatus 10 of the first embodiment includes a magnetic sheet 1 disposed between the spiral coil (power receiving coil) 16 and the secondary battery 18. Specifically, the spiral coil 16 and the secondary battery 18 are arranged by sandwiching the magnetic sheet 1. The spiral coil 16 has a flat portion as at least one portion thereof, and this flat portion is arranged along a surface of the magnetic sheet 1. When seen as the power receiving device 11, the magnetic sheet 1 is arranged between the spiral coil 16 and the secondary battery 18 configuring the device.

As illustrated in FIG. 11, the electronic apparatus 10 of the second embodiment includes the magnetic sheet 1 disposed between the secondary battery 18 and the circuit board 13. Further, the magnetic sheet 1 may be arranged between the spiral coil 16 and the rectifier 17 or between the spiral coil 16 and the electronic device 14. The magnetic sheet 1 is arranged in one or more of these respective positions. The magnetic sheet 1 may be arranged in two or more of the positions.

The configuration of the electronic apparatus 10 is not limited to one illustrated in FIG. 10 and FIG. 11. Arrangement of the spiral coil 16, the secondary battery 18 and the circuit board 13 can be changed in various ways. For example, the secondary battery, the circuit board, and the spiral coil may be arranged in order from the top side. The magnetic sheet 1 is arranged between the circuit board and the spiral coil, for example. When the magnetic sheet 1 is arranged between the spiral coil 16 and the circuit board 13, it is possible to simply stack the spiral coil 16/magnetic sheet 1/circuit board 13, or to fix them with an adhesive or a brazing material with each other. The same applies to other cases, and the respective components may just be stacked, or may be fixed with an adhesive or a brazing material with each other.

As described above, by arranging the magnetic sheet 1 in at least one of the position between the spiral coil 16 and the secondary battery 18, the position between the spiral coil 16 and the rectifier 17, the position between the spiral coil 16 and the electronic device 14, and the position between the spiral coil 16 and the circuit board 13, a magnetic flux passing through the spiral coil 16 during charging can be shielded by the magnetic sheet 1. Accordingly, a magnetic flux interlinked with the circuit board 13 or the like in the electronic apparatus 10 decreases, which enables to suppress the generation of eddy current due to the electromagnetic induction. A thickness of the magnetic sheet 1 is preferably set to fall within a range of 1 mm or less by taking installability, shielding property of magnetic flux and the like into consideration.

By suppressing the influence of eddy current, it is possible to suppress heat generation in the electronic device 14 mounted on the circuit board 13 and the rectifier 17, heat generation of the circuit of the circuit board 13, as well as generation of noise due to the eddy current. Suppression of heat generation in the electronic apparatus 10 contributes to improvement in the performance and reliability of the secondary battery 18. By suppressing the decrease in the Q value due to the eddy current loss, the power supplied to the power receiving device 11 can be increased. The magnetic sheet 1 also functions as a magnetic core with respect to the spiral coil 16, so that the power receiving efficiency and the charging efficiency can be enhanced. They contribute to reduction in charging time with respect to the electronic apparatus 10. The eddy current generated in the case of the secondary battery 18 can also be suppressed, so that the temperature increase of the secondary battery during charging is small, and no deterioration of life characteristics is caused.

The magnetic sheet 1 of the embodiment described above is used as, for example, a magnetic substance for inductor or a magnetic substance for magnetic shield (including a noise suppression sheet). Particularly, the magnetic sheet 1 is suitable for a magnetic sheet used in a frequency band of 100 kHz or more. Specifically, the effect of improving the Q value and the effect of reducing the eddy current loss based on the magnetic thin strips 2 having the cutout portions 4 are more favorably exhibited in a frequency band of 100 kHz or more. Therefore, the magnetic sheet 1 is suitable for a magnetic substance for inductor or a magnetic substance for magnetic shield used in a frequency band of 100 kHz or more.

In the power receiving device 11 of the embodiment and the electronic apparatus 10 using the same, since the eddy current due to the magnetic flux interlinked with the spiral coil 16 is suppressed, the heat generation in the apparatus can be reduced, and the power receiving efficiency can be improved. Thus, when feeding power, the power can be made large, and the charging time can be reduced. The electronic apparatus 10 of this embodiment is suitable for mobile phones, mobile audio devices, digital cameras, game machines, and the like. The electronic apparatus 10 as such is set on the power feeding device, and charging is performed in a non-contact manner.

Figure 12:
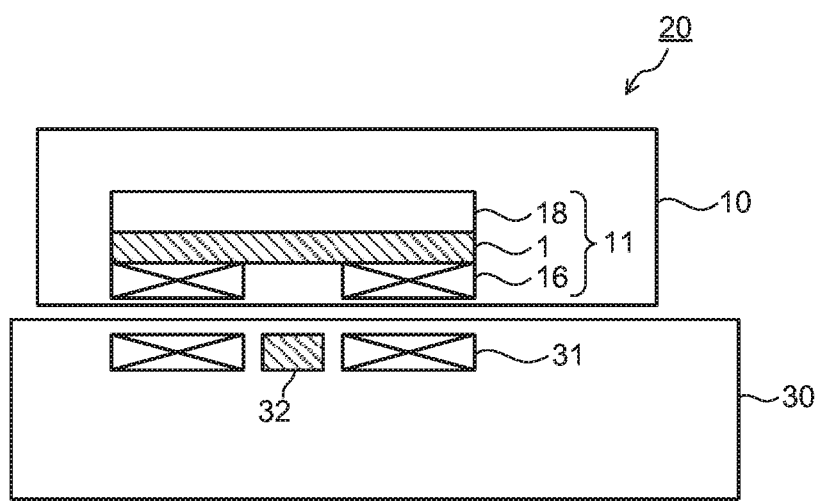
FIG. 12 is a diagram illustrating a schematic configuration of a non-contact charging system according to an embodiment.

FIG. 12 illustrates a configuration of a non-contact charging system according to an embodiment. A non-contact charging system 20 includes the electronic apparatus 10 and a power feeding device 30. In the non-contact charging system 20, the electronic apparatus 10 is the one illustrated in the above-described embodiments. The power feeding device 30 includes a power feeding coil 31, a magnet 32 for performing positioning of the power receiving device 11, a not-illustrated power supply applying an alternating voltage to the power feeding coil 31, and the like. When the electronic apparatus 10 is set on the power feeding device 30, the power feeding coil 31 is arranged in a non-contact manner with respect to the power receiving coil 16.

The charging by the non-contact charging system 20 is performed as follows. An alternating voltage is applied from the power supply to the power feeding coil 31 of the power feeding device 30, and a magnetic flux is generated in the power feeding coil 31. The magnetic flux generated in the power feeding coil 31 is transmitted to the power receiving coil 16 arranged in a non-contact manner with respect to the power feeding coil 31. In the power receiving coil 16, upon reception of the magnetic flux, an alternating voltage is generated by an electromagnetic induction. This alternating voltage is rectified in the rectifier 17. A direct-current voltage rectified in the rectifier 17 is charged to the secondary battery 18.

In the non-contact charging system 20, transmission of power is performed in a non-contact manner. The power feeding device 30 illustrated in FIG. 12 includes the magnet 32 for performing the positioning of the power receiving device 11. Although one magnet 32 is arranged at a center of the power feeding coil 31, the present invention is not limited to this. Although the magnet 32 is not particularly limited as long as it is a permanent magnet, it is preferably a Nd—Fe—B-based magnet. Although various magnets such as a Sm—Co-based magnet and a Sm—Fe—N-based magnet are known as a permanent magnet, the Nd—Fe—B-based magnet is relatively inexpensive and thus has high general versatility. The Nd—Fe—B-based magnet may be a sintered body or a bond magnet (mixture of Nd—Fe—B-based magnet powder and resin). As long as the magnetic sheet 1 of the embodiment is employed, even when the magnet 32 is mounted on the power feeding device 30, no magnetic saturation occurs, and the sheet functions as the magnetic shield or the inductor. Besides, it is possible to improve the power receiving efficiency of the power receiving device 11. It is also possible that a not-illustrated part such as a magnetic core for controlling the magnetic flux is mounted on the power feeding device 30.

EXAMPLES

Next, concrete examples of the present invention and evaluation results thereof will be described.
(Non-Contact Charging System)

As the non-contact charging system, a charging system for a mobile phone was prepared. A power feeding device is one in which power from an AC power supply is converted into a constant electromagnetic wave via a control circuit, and a primary coil (power feeding coil) transmitting the electromagnetic wave is arranged in the vicinity of a mounting table. Note that at a center portion of the primary coil, a NdFeB-based bond magnet (residual magnetic flux density (Br): 0.75 T, coercive force (Hc): 760 kA/m) having a diameter of 15 mm and a thickness of 0.5 mm was arranged. The mobile phone includes, as a power receiving device, a secondary coil (power receiving coil) formed of a spiral coil, a circuit board on which a rectifier rectifying alternating power generated in the secondary coil is mounted, and a secondary battery. The secondary coil is one such that a copper wire is wound in a plane shape with an outer periphery of 30 mm and an inner periphery of 23 mm.

Comparative Example A

In the above-described mobile phone, a power receiving device was configured without using a magnetic sheet. The mobile phone using this power receiving device and the non-contact charging system were designated as a comparative example A.

Examples 1 to 7, Comparative Examples 1 to 3

A long amorphous alloy thin strip (magnetic thin strip) having a composition of $Fe_{66}Co_{18}Si_1B_{15}$ with a thickness of 20 μm and a width of 50 mm was produced by a single roll method. A saturation magnetization of this magnetic thin strip was 1.8 T, and a saturation magnetostriction constant of the strip was 32 ppm. The obtained magnetic thin strip is used without being subjected to heat treatment, so that it was possible to bend the strip to 180°.

Next, the long magnetic thin strip was cut into 42 mm×42 mm pieces, various numbers of slits (cutout portions) with a length of 30 to 40 mm penetrating in a thickness direction of the magnetic thin strips were formed by an etching method, thereby producing magnetic thin strips. Thereafter, the strip was attached to a PET film (thickness of 80 μm) to which an acryl-based adhesive (thickness of 10 μm) was applied. All widths of the slits (cutout portions) were set to fall within a range of 0.1 to 0.5 mm. A ratio of A (a total outer peripheral length of an outer peripheral area of the magnetic thin strip arranged on the same resin film part) to B (a total length of the cutout portions whose width is 1 mm or less (including 0 (zero)) provided to the magnetic thin strip) (B/A) is in a range presented in Table 1. 12 pieces of these were stacked to produce a magnetic sheet according to each of the examples. Each of the magnetic sheets was formed in a shape of completely covering the magnetic thin strips with the resin film parts. Each of the magnetic sheets has a thickness in a range of 0.54 to 0.56 mm.

The same magnetic thin strip with no slits (cutout portions) formed thereon was designated as a comparative example 1, the same magnetic thin strip having the B/A ratio of 1 was designated as a comparative example 2, the same magnetic thin strip having the B/A ratio of 28 was designated as a comparative example 3, and 12 pieces of each of the magnetic thin strips were stacked to produce magnetic sheets, similar to the examples. Each of the magnetic sheets was formed in a shape of completely covering the magnetic thin strips with the resin film parts.

Examples 8 to 12, Comparative Examples 4 to 9

A long amorphous alloy thin strip (magnetic thin strip) having a composition of $Fe_{66}Co_{18}Si_1B_{15}$ with a thickness of 22 μm and a width of 50 mm was produced by a single roll method. A saturation magnetization of this magnetic thin strip was 1.8 T, and a saturation magnetostriction constant of the strip was 32 ppm. The obtained magnetic thin strip is used without being subjected to heat treatment, so that it was possible to bend the strip to 180°.

Next, the long magnetic thin strip was cut into 20 mm×20 mm pieces, and slits (cutout portions) with a length of 10 to 15 mm penetrating in a thickness direction of the magnetic thin strips were formed by an etching method, in which widths of the slits were unified to 0.1 mm. Thereafter, 4 pieces of the strips were attached onto a PET film (thickness of 80 μm) to which an acryl-based adhesive (thickness of 10 μm) was applied, as illustrated in FIG. 4. At this time, an interval was set to 0.5 mm. The B/A ratios were unified to 15. The PET film was peeled off from the sample, and the magnetic thin strips were stacked via adhesive layers to produce a magnetic sheet. Stacked numbers of the magnetic thin strips are as presented in Table 2. Each of the magnetic sheets was formed in a shape of completely covering the magnetic thin strips with the resin film parts, and an upper surface and a lower surface thereof were protected by PET films. Thicknesses of the magnetic sheets are presented in Table 2.

As a comparative example, an amorphous alloy thin strip (sheet thickness of 17 μm) having a saturation magnetostriction constant of zero and having a composition of $Co_{68}Fe_{4.5}Cr_{2.5}Si_{15}B_{10}$ was produced. Cutout portions (widths thereof were unified to 0.5 mm) having the B/A ratio of 1 were formed on the strip. The magnetic thin strips were stacked in numbers presented in Table 2, to thereby produce magnetic sheets of comparative examples 4 to 9. Thicknesses of the magnetic sheets are presented in Table 2.

Examples 13 to 38, Comparative Examples 10 to 28

Amorphous alloy thin strips having compositions presented in Table 3 and each having a width of 50 mm were produced by a single roll method. Saturation magnetizations, saturation magnetostriction constants, and sheet thicknesses of the respective thin strips are as presented in Table 3. The obtained magnetic thin strips are used without being subjected to heat treatment, so that it was possible to bend the strips to 180°.

Next, the magnetic thin strip was cut into 20 mm×20 mm pieces, and various numbers of slits (cutout portions) with a length of 10 to 15 mm penetrating in a thickness direction of the magnetic thin strips were formed by an etching method, thereby producing magnetic thin strips. Widths of the slits (cutout portions) formed by the etching were unified to 0.1 mm. Thereafter, 4 pieces of the strips were attached onto a PET film (thickness of 80 μm) to which an acryl-based adhesive (thickness of 10 μm) was applied, as illustrated in FIG. 4. At this time, an interval was set to 0 (zero) (arrangement in a contacted manner) to 1 mm. The B/A ratios are as presented in Table 3. The PET film was peeled off from the sample, and 10 pieces of the magnetic thin strips were stacked via adhesive layers to produce magnetic sheets of examples 13 to 38. Thicknesses of the magnetic sheets are presented in Table 3.

Magnetic thin strips having compositions presented in Table 4 were used to produce magnetic sheets of comparative examples 10 to 28. In the comparative examples 26 to 28, microcrystalline alloy thin strips made of $Fe_{74}Cu_1Nb_3Si_{14}B_8$ (average crystal grain diameter of 30 nm) were used. Thicknesses of the magnetic sheets are presented in Table 4.

Example 39

An amorphous alloy thin strip (magnetic thin strip) having a composition of $Fe_{66}Co_{18}Si_1B_{15}$ with a sheet thickness of 16 μm and a width of 50 mm was produced by a single roll method. A saturation magnetization and a saturation magnetostriction constant of the magnetic thin strip are as presented in Table 3. The obtained magnetic thin strip is used without being subjected to heat treatment, so that it was possible to bend the strip to 180°. Next, the magnetic thin strip was cut into 41 mm in length×1 mm in width. The cut 41 pieces of the magnetic thin strips were arranged on a PET film (thickness of 25 μm) to which an acryl-based adhesive (thickness of 10 μm) was applied, with a gap therebetween of 0 (zero) mm (the strips were arranged in a contact manner). 10 pieces of the resultant were stacked to produce a magnetic sheet of the example 39. A structure in which all surfaces of the magnetic thin strips were covered by the resin film parts was employed. A thickness of the magnetic sheet is 0.34 mm.

Regarding the magnetic sheets of the examples 1 to 39 and the comparative examples 1 to 28, Q values and L values were measured by using an impedance analyzer (HP4192A). In order to evaluate characteristics of the non-contact charging system, coupling efficiencies (power receiving efficiencies) and heating values were measured. The coupling efficiencies were evaluated by how much power can be transmitted to the secondary coil (power receiving coil) when constant power (1 W) is transmitted from the primary coil (power feeding coil). When the coupling efficiency (power amount transmitted to the secondary coil) of the comparative example A (structure in which no magnetic sheet is used) is set to 100, one with improvement of 20% or more and less than 40% (120 or more and less than 140) is shown by □□, one with improvement of 40% or more (140 or more) is shown by □□□, and one with improvement of less than 20% (less than 120) is shown by X. When the coupling efficiency is high, this means that the power receiving efficiency is good.

Regarding the heating values, power transmission was performed at a transmission rate of 0.4 W/h and at a transmission rate of 1.5 W/h for two hours, and temperature increases after two hours were measured. One with a temperature increase of 25° C. or less is shown by □□□, one with a temperature increase higher than 25° C. and equal to or less than 40° C. is shown by □□, and one with a temperature increase higher than 40° C. is shown by x. Note that the temperature before the power transmission was unified at a room temperature of 25° C. When the temperature increase is small, this means that the generation of eddy current is prevented. Measurement results are presented in Table 1 to Table 4.

TABLE 1

| | | | | Heating value | |
|---|---|---|---|---|---|
| | B/A | L(μH) | Q | Coupling Efficiency | 0.4 W/h | 1.5 W/h |
| Example 1 | 2.0 | 12.5 | 10.1 | □□ | □□□ | □□□ |
| Example 2 | 6.8 | 12.4 | 11.3 | □□□ | □□□ | □□□ |
| Example 3 | 8.8 | 12.5 | 11.6 | □□□ | □□□ | □□□ |
| Example 4 | 12.0 | 12.2 | 12.0 | □□□ | □□□ | □□□ |
| Example 5 | 16.8 | 12.0 | 12.3 | □□□ | □□□ | □□□ |
| Example 6 | 21.0 | 11.6 | 12.5 | □□□ | □□□ | □□□ |
| Example 7 | 25.0 | 10.5 | 12.6 | □□□ | □□ | □□ |
| Comparative Example 1 | 0.0 | 12.5 | 3.9 | X | □□ | □ |
| Comparative Example 2 | 1.0 | 12.5 | 8.0 | X | □□ | □ |
| Comparative Example 3 | 28.0 | 8.9 | 12.8 | □□ | X | X |

TABLE 2

|  | Sheet thickness (μm) | Thickness of magnetic sheet (μm) | B/A | Stacked number | L(μH) | Q | Coupling Efficiency | Heating value 0.4 W/h | 1.5 W/h |
|---|---|---|---|---|---|---|---|---|---|
| Example 8 | 22 | 0.390 | 15 | 6 | 10.1 | 12.2 | ** | ** | ** |
| Example 9 | 22 | 0.520 | 15 | 10 | 11.3 | 12.6 | *** | *** | *** |
| Example 10 | 22 | 0.690 | 15 | 15 | 13.2 | 12.5 | *** | *** | *** |
| Example 11 | 22 | 0.860 | 15 | 20 | 13.9 | 12.3 | *** | *** | *** |
| Example 12 | 22 | 0.980 | 15 | 25 | 14.4 | 12.2 | *** | *** | *** |
| Comparative Example 4 | 18 | 0.480 | 1 | 10 | 9.2 | 4.0 | X | X | X |
| Comparative Example 5 | 18 | 0.770 | 1 | 20 | 10.0 | 4.1 | X | X | X |
| Comparative Example 6 | 18 | 0.920 | 1 | 25 | 10.4 | 4.4 | X | X | X |
| Comparative Example 7 | 18 | 1.040 | 1 | 30 | 11.0 | 4.9 | X | ** | X |
| Comparative Example 8 | 18 | 1.350 | 1 | 40 | 11.9 | 5.0 | X | ** | ** |
| Comparative Example 9 | 18 | 1.630 | 1 | 50 | 12.7 | 5.1 | X | ** | ** |

TABLE 3

| E | Composition | <1> | <2> | <3> | <4> | <5> | <6> | <7> | B/A | <8> | <9> | <10> | <11> | <12> 0.4 W/h | 1.5 W/h |
|---|---|---|---|---|---|---|---|---|---|---|---|---|---|---|---|
| 13 | Fe78Si8B14 | 10 | 25 | 1.56 | 28 | none | P | 0.1 | 8.8 | 0.550 | 12.1 | 11.8 | *** | *** | *** |
| 14 | Fe75Cr2Si5B16 | 10 | 20 | 1.40 | 20 | none | P | 0.1 | 8.8 | 0.500 | 11.8 | 11.7 | *** | *** | *** |
| 15 | Fe75Cr3P9B6C3Si4 | 10 | 20 | 1.32 | 15 | none | P | 0.3 | 8.8 | 0.490 | 11.0 | 10.6 | ** | *** | ** |
| 16 | Fe75Nb3Si8B14 | 10 | 20 | 1.35 | 16 | none | P | 0.1 | 8.8 | 0.500 | 11.1 | 10.9 | ** | *** | ** |
| 17 | Fe74Nb4Si8B14 | 10 | 20 | 1.22 | 15 | none | P | 0.3 | 8.8 | 0.505 | 10.8 | 10.8 | ** | ** | ** |
| 18 | Fe74Cu1Nb3Si14B8 | 10 | 18 | 1.32 | 18 | none | P | 0.1 | 8.8 | 0.480 | 10.8 | 10.5 | ** | ** | ** |
| 19 | Fe65Ni10Si10B15 | 10 | 25 | 1.26 | 18 | none | P | 0.2 | 8.8 | 0.550 | 11.0 | 10.7 | ** | ** | ** |
| 20 | Fe65Co17Mn2Si1B15 | 10 | 16 | 1.71 | 31 | none | P | 0.0 | 12.0 | 0.460 | 12.4 | 12.6 | *** | *** | *** |
| 21 | Fe65Co17Cr2Si1B15 | 10 | 16 | 1.70 | 31 | none | P | 0.2 | 12.0 | 0.465 | 12.3 | 12.8 | *** | *** | *** |
| 22 | Fe65Co17Ti2Si1B15 | 10 | 16 | 1.72 | 31 | none | P | 0.1 | 12.0 | 0.465 | 12.5 | 12.4 | *** | *** | *** |
| 23 | Fe65Co17Zr2Si1B15 | 10 | 16 | 1.71 | 31 | none | P | 0.1 | 12.0 | 0.470 | 12.4 | 12.4 | *** | *** | *** |
| 24 | Fe65Co17Hf2Si1B15 | 10 | 16 | 1.72 | 31 | none | P | 0.1 | 12.0 | 0.470 | 12.5 | 12.5 | *** | *** | *** |
| 25 | Fe65Co17Mo2Si1B15 | 10 | 16 | 1.71 | 31 | none | P | 0.1 | 12.0 | 0.460 | 12.4 | 12.7 | *** | *** | *** |
| 26 | Fe65Co17V2Si1B15 | 10 | 16 | 1.71 | 30 | none | P | 0.1 | 12.0 | 0.460 | 12.5 | 12.7 | *** | *** | *** |
| 27 | Fe65Co17Nb2Si1B15 | 10 | 16 | 1.70 | 30 | none | P | 0.1 | 12.0 | 0.450 | 12.5 | 12.8 | *** | *** | *** |
| 28 | Fe65Co17W2Si1B15 | 10 | 16 | 1.70 | 30 | none | P | 0.1 | 12.0 | 0.460 | 12.3 | 12.6 | *** | *** | *** |
| 29 | Fe65Co17Ta2Si1B15 | 10 | 16 | 1.70 | 30 | none | P | 0.1 | 12.0 | 0.470 | 12.4 | 12.7 | *** | *** | *** |
| 30 | Fe65Co17Sn2Si1B15 | 10 | 16 | 1.70 | 30 | none | P | 0.1 | 12.0 | 0.470 | 12.4 | 12.0 | *** | *** | *** |
| 31 | Fe64Co17Cr3Si1B7P8 | 10 | 16 | 1.72 | 30 | none | P | 0.1 | 16.8 | 0.460 | 11.4 | 13.2 | *** | *** | *** |
| 32 | Fe66Co18Si1B13C2 | 10 | 16 | 1.71 | 30 | none | P | 0.1 | 16.8 | 0.470 | 11.3 | 13.0 | *** | *** | *** |
| 33 | Fe65Co17Ce2Si1B15 | 10 | 18 | 1.74 | 36 | none | P | 0.1 | 6.8 | 0.515 | 11.7 | 11.3 | *** | *** | ** |
| 34 | Fe65Co17Pr2Si1B15 | 10 | 18 | 1.75 | 36 | none | P | 0.1 | 6.8 | 0.520 | 11.5 | 11.5 | *** | *** | ** |
| 35 | Fe65Co17Nd2Si1B15 | 10 | 18 | 1.74 | 38 | none | P | 0.1 | 6.8 | 0.515 | 11.8 | 11.2 | *** | *** | ** |
| 36 | Fe65Co17Sm2Si1B15 | 10 | 18 | 1.75 | 38 | none | P | 0.1 | 6.8 | 0.520 | 11.7 | 11.5 | *** | *** | ** |
| 37 | Fe65Co17Dy2Si1B15 | 10 | 18 | 1.75 | 42 | none | P | 0.1 | 6.8 | 0.520 | 11.6 | 11.3 | *** | *** | ** |
| 38 | Fe65Co17Tb2Si1B15 | 10 | 18 | 1.75 | 44 | none | P | 0.1 | 6.8 | 0.525 | 11.7 | 11.2 | *** | *** | ** |
| 39 | Fe66Co18Si1B15 | 10 | 16 | 1.81 | 32 | none | P | 0.0 | 10.0 | 0.340 | 12.6 | 12.4 | *** | *** | *** |

E: Example

P: Possible

<1>: Stacked Number

<2>: Sheet Thickness (μm)

<3>: Saturation Magnetization (T)

<4>: Saturation Magnetostriction Constant (ppm)

<5>: Heat Treatment Condition

<6>: 180° Bending

<7>: Width of Cutout Portion (mm)

<8>: Thickness of Magnetic Sheet (mm)

<9>: L (μH)

<10>: Q

<11>: Coupling Efficiency

<12>: Heating Value

TABLE 4

| CE | Composition | <1> | <2> | <3> | <4> | <5> | <6> | <7> | B/A | <8> | <9> | <10> | <11> | <12> 0.4 W/h | 1.5 W/h |
|---|---|---|---|---|---|---|---|---|---|---|---|---|---|---|---|
| 10 | Co65Fe4Ni2Si15B14(Metglas2714A) | 10 | 20 | 0.54 | 0 | none | P | 0.1 | 6.8 | 0.500 | 8.3 | 8.7 | X | X | X |
| 11 | Co65Fe4Ni2Si15B14(Metglas2714A) | 10 | 20 | 0.54 | 0 | 440° C., 30 m | NP | 0.2 | 6.8 | 0.505 | 8.0 | 7.6 | X | X | X |
| 12 | Co68Fe4.5Cr2.5Si15B10 | 10 | 17 | 0.56 | 0 | none | P | 0.3 | 7.2 | 0.300 | 8.2 | 8.6 | X | X | X |
| 13 | Co68Fe4.5Cr2.5Si15B10 | 10 | 17 | 0.56 | 0 | 440° C., 30 m | NP | 0.2 | 7.2 | 0.305 | 7.9 | 7.7 | X | X | X |
| 14 | Fe74Cu1Nb3Si14B8 | 10 | 18 | 1.32 | 1 | 560° C., 1 H | NP | 0.0 | 12.0 | 0.310 | 8.8 | 9.4 | X | X | X |
| 15 | Fe65Ni10Si10B15 | 10 | 25 | 1.43 | 24 | 420° C., 1 H | NP | 0.2 | 12.0 | 0.390 | 9.2 | 9.2 | X | X | X |
| 16 | Fe65Co17Mn2Si1B15 | 10 | 16 | 1.71 | 31 | 360° C., 1.5 H | NP | 0.5 | 12.0 | 0.290 | 8.9 | 9.0 | X | X | X |
| 17 | Fe65Co17Cr2Si1B15 | 10 | 16 | 1.70 | 31 | 360° C., 1.5 H | NP | 0.2 | 12.0 | 0.280 | 9.1 | 9.3 | X | X | X |
| 18 | Fe65Co17Ti2Si1B15 | 10 | 16 | 1.72 | 31 | 360° C., 1.5 H | NP | 0.1 | 12.0 | 0.290 | 9.4 | 8.8 | X | X | X |
| 19 | Fe65Co17Zr2Si1B15 | 10 | 16 | 1.71 | 31 | 360° C., 1.5 H | NP | 0.2 | 12.0 | 0.290 | 9.2 | 8.9 | X | X | X |
| 20 | Fe65Co17Hf2Si1B15 | 10 | 16 | 1.72 | 31 | 360° C., 1.5 H | NP | 0.6 | 12.0 | 0.300 | 9.3 | 9.2 | X | X | X |
| 21 | Fe65Co17Mo2Si1B15 | 10 | 16 | 1.71 | 31 | 360° C., 1.5 H | NP | 0.2 | 12.0 | 0.300 | 8.9 | 9.3 | X | X | X |
| 22 | Fe75Nb8Si5B12 | 10 | 14 | 1.06 | 8 | 460° C., 0.5 H | NP | 0.1 | 12.0 | 0.265 | 8.9 | 9.0 | X | X | X |
| 23 | Fe78Si8B14 | 1 | 25 | 1.56 | 28 | none | P | 0.2 | 0.0 | 0.200 | 7.6 | 3.8 | X | X | X |
| 24 | Fe78Si8B14 | 3 | 25 | 1.56 | 28 | none | P | 0.6 | 0.0 | 0.250 | 7.9 | 3.9 | X | X | X |
| 25 | Fe78Si8B14 | 3 | 25 | 1.56 | 28 | none | P | 0.0 | 1.0 | 0.250 | 7.9 | 4.7 | X | X | X |
| 26 | Fe74Cu1Nb3Si14B8 | 1 | 18 | 1.35 | 18 | none | P | 0.1 | 0.0 | 0.210 | 7.6 | 3.8 | X | X | X |
| 27 | Fe74Cu1Nb3Si14B8 | 3 | 18 | 1.35 | 18 | none | P | 0.2 | 0.0 | 0.275 | 8.0 | 3.9 | X | X | X |
| 28 | Fe74Cu1Nb3Si14B8 | 3 | 18 | 1.35 | 18 | none | P | 0.1 | 1.0 | 0.280 | 8.0 | 4.5 | X | X | X |

CE: Comparative Example
P: Possible
NP: Not Possible
<1>: Stacked Number
<2>: Sheet Thickness (μm)
<3>: Saturation Magnetization (T)
<4>: Saturation Magnetostriction Constant (ppm)
<5>: Heat Treatment Condition
<6>: 180° Bending
<7>: Width of Cutout Portion (mm)
<8>: Thickness of Magnetic Sheet (mm)
<9>: L (μH)
<10>: Q
<11>: Coupling Efficiency
<12>: Heating Value As is apparent from Table 1 to Table 4, in the non-contact charging systems using the magnetic sheets of the examples, the high coupling efficiency is provided, and the heating value is kept low. It was confirmed that excellent characteristics are exhibited even under the environment in which the magnet is arranged in the power feeding device and the magnetic saturation is easily caused.

On the contrary, in the non-contact charging systems using the magnetic sheets of the comparative examples, the coupling efficiency was small, and the heating value was large. This is because the magnetic saturation occurred in the magnetic sheets of the comparative examples due to the arrangement of magnet in the power feeding device. In other words, it can be said that the magnetic sheets of the examples are particularly effective for the non-contact charging system in which the magnet is arranged in the power feeding device (the positioning of the power receiving device is conducted by the magnet). By forming the PET films on the upper and lower surfaces of the magnetic sheet using a thin material, or by reducing the thickness of the adhesive layer, a thinner magnetic sheet can be provided.

Examples 40 to 50, Comparative Examples 29 and 30

Magnetic sheets of examples 40 to 50 and comparative examples 29 and 30 presented in Table 5 were prepared. Q values and L values of the magnetic sheets were measured using an impedance analyzer (HP4192A). Results thereof are presented in Table 5.

TABLE 5

| | Composition | <1> | <2> | <3> | <4> | <5> | <6> | <7> | B/A | <8> | <9> | <10> |
|---|---|---|---|---|---|---|---|---|---|---|---|---|
| E40 | Fe66Co18Si1B15 | 10 | 20 | 1.81 | 32 | none | Can be bent | 0.1 | 21.0 | 0.540 | 11.6 | 12.5 |
| E41 | Fe78Si8B14 | 10 | 25 | 1.56 | 28 | none | P | 0.1 | 8.8 | 0.550 | 12.1 | 11.8 |
| E42 | Fe75Cr2Si5B16 | 10 | 20 | 1.40 | 20 | none | P | 0.1 | 8.8 | 0.500 | 11.8 | 11.7 |

TABLE 5-continued

| | Composition | <1> | <2> | <3> | <4> | <5> | <6> | <7> | B/A | <8> | <9> | <10> |
|---|---|---|---|---|---|---|---|---|---|---|---|---|
| E43 | Fe65Co17Mn2Si1B15 | 10 | 16 | 1.71 | 31 | none | P | 0.0 | 12.0 | 0.460 | 12.4 | 12.6 |
| E44 | Fe65Co17Cr2Si1B15 | 10 | 16 | 1.70 | 31 | none | P | 0.2 | 12.0 | 0.465 | 12.3 | 12.8 |
| E45 | Fe65Co17Ti2Si1B15 | 10 | 16 | 1.72 | 31 | none | P | 0.1 | 12.0 | 0.465 | 12.5 | 12.4 |
| E46 | Fe65Co17Zr2Si1B15 | 10 | 16 | 1.71 | 31 | none | P | 0.1 | 12.0 | 0.470 | 12.4 | 12.4 |
| E47 | Fe65Co17Hf2Si1B15 | 10 | 16 | 1.72 | 31 | none | P | 0.1 | 12.0 | 0.470 | 12.5 | 12.5 |
| E48 | Fe65Co17Mo2Si1B15 | 10 | 16 | 1.71 | 31 | none | P | 0.1 | 12.0 | 0.460 | 12.4 | 12.7 |
| E49 | Fe65Co17V2Si1B15 | 10 | 16 | 1.71 | 30 | none | P | 0.1 | 12.0 | 0.460 | 12.5 | 12.7 |
| E50 | Fe65Co17Nb2Si1B15 | 10 | 16 | 1.70 | 30 | none | P | 0.1 | 12.0 | 0.450 | 12.5 | 12.8 |
| CE29 | Co65Fe4Ni2Si15B14(Metglas2714A) | 10 | 20 | 0.54 | 0 | none | P | 0.1 | 6.8 | 0.500 | 8.3 | 8.7 |
| CE30 | Co65Fe4Ni2Si15B14(Metglas2714A) | 10 | 20 | 0.54 | 0 | 440° C., 30 M | NP | 0.2 | 6.8 | 0.505 | 8.0 | 7.6 |

E: Example
CE: Comparative Example
P: Possible
NP: Not Possible
<1>: Stacked Number
<2>: Sheet Thickness (μm)
<3>: Saturation Magnetization (T)
<4>: Saturation Magnetostriction Constant (ppm)
<5>: Heat Treatment Condition
<6>: 180° Bending
<7>: Width of Cutout Portion (mm)
<8>: Thickness of Magnetic Sheet (mm)
<9>: L (μH)
<10>: Q
<11>: Coupling Efficiency
<12>: Heating Value Next, as the non-contact charging system, a charging system for a mobile phone was prepared. A power feeding device is one in which power from an AC power supply (0.5 A or 1.0 A) is converted into a constant electromagnetic wave via a control circuit, and a primary coil (power feeding coil) transmitting the electromagnetic wave is arranged in the vicinity of a mounting table. Note that at a center portion of the primary coil, any one of a NdFeB-based sintered magnet, a ferrite sintered magnet, and a SmCo-based sintered magnet having a diameter of 15 mm and a thickness of 0.5 mm was arranged. The mobile phone includes, as a power receiving device, a secondary coil (power receiving coil) formed of a spiral coil, a circuit board on which a rectifier rectifying alternating power generated in the secondary coil is mounted, and a secondary battery. The secondary coil is one such that a copper wire is wound in a plane shape with an outer periphery of 30 mm and an inner periphery of 23 mm.

Coupling efficiencies and heating values when the current of AC power supply was changed to 0.5 A or 1.0 A, and further, the magnet was changed to the NdFeB-based sintered magnet, the ferrite sintered magnet, or the SmCo-based sintered magnet, were measured. Magnetic characteristics are as presented in Table 6.

TABLE 6

| Magnet | Br (T) | Hc (kA/m) |
|---|---|---|
| NdFeB magnet | 1.42 | 1230 |
| SmCo magnet | 1.02 | 790 |
| Ferrite magnet | 0.43 | 395 |

The coupling efficiencies were evaluated by how much power can be transmitted to the secondary coil (power receiving coil) when a current value of the AC power supply is set to 0.5 A or 1.0 A, and constant power (1 W) is transmitted from the primary coil (power feeding coil). When the coupling efficiency (power amount transmitted to the secondary coil) of the comparative example A (structure in which no magnetic sheet is used) is set to 100, one with improvement of 20% or more and less than 40% (120 or more and less than 140) is shown by ☐☐, one with improvement of 40% or more (140 or more) is shown by ☐☐☐, and one with improvement of less than 20% (less than 120) is shown by X. When the coupling efficiency is high, this means that the power receiving efficiency is good.

Regarding the heating values, power transmission when the current value of the AC power supply was set to 0.5 A or 1.0 A was performed for two hours, and temperature increases after two hours were measured. One with a temperature increase of 25° C. or less is shown by ☐☐☐, one with a temperature increase higher than 25° C. and equal to or less than 40° C. is shown by ☐☐, and one with a temperature increase higher than 40° C. is shown by X. Note that the temperature before the power transmission was unified at a room temperature of 25° C. When the temperature increase is small, this means that the generation of eddy current is prevented. Measurement results are presented in Table 7.

TABLE 7

| | Coupling efficiency | | | | | | Heating value | | | | | |
|---|---|---|---|---|---|---|---|---|---|---|---|---|
| | 0.5 A | | | 1.0 A | | | 0.5 A | | | 1.0 A | | |
| | <1> | <2> | <3> | <1> | <2> | <3> | <1> | <2> | <3> | <1> | <2> | <3> |
| Example 40 | *** | *** | *** | ** | *** | *** | *** | *** | *** | ** | *** | *** |
| Example 41 | ** | *** | *** | ** | *** | ** | ** | *** | *** | ** | *** | ** |
| Example 42 | ** | *** | *** | ** | *** | ** | ** | *** | *** | ** | *** | ** |
| Example 43 | ** | *** | *** | ** | *** | *** | *** | *** | *** | ** | *** | *** |
| Example 44 | ** | *** | *** | ** | *** | *** | *** | *** | *** | ** | *** | *** |
| Example 45 | ** | *** | *** | ** | *** | *** | *** | *** | *** | ** | *** | *** |
| Example 46 | ** | *** | *** | ** | *** | *** | *** | *** | *** | ** | *** | *** |
| Example 47 | ** | *** | *** | ** | *** | *** | *** | *** | *** | ** | *** | *** |
| Example 48 | ** | *** | *** | ** | *** | *** | *** | *** | *** | ** | *** | *** |
| Example 49 | ** | *** | *** | ** | *** | *** | *** | *** | *** | ** | *** | *** |
| Example 50 | ** | *** | *** | ** | *** | ** | *** | *** | *** | ** | *** | ** |
| Comparative Example 29 | X | X | X | X | X | X | X | X | X | X | X | X |
| Comparative Example 30 | X | X | X | X | X | X | X | X | X | X | X | X |

<1>: NdFeB-based sintered magnet
<2>: Ferrite-based sintered magnet
<3>: SmCo-based sintered magnet As is apparent from Table 7, the magnetic sheets of the examples exhibited excellent characteristics even when the current value of the AC power supply was changed. Further, excellent characteristics were exhibited even when the type of magnet was changed. Accordingly, even when the AC power supply and the material of the magnet for positioning were changed, with the use of the magnetic sheets of the examples, it is possible to improve the power receiving efficiencies and to reduce the heating values. For this reason, it is possible to drastically improve the reliability of the power receiving device and the non-contact charging system.

While certain embodiments of the present invention have been described, these embodiments have been presented by way of example only, and are not intended to limit the scope of the inventions. Indeed, these novel embodiments can be carried out in various other forms, and various omissions, substitutions, and changes can be made therein without departing from the spirit of the invention. These embodiments and modifications thereof are included in the scope and the spirit of the invention and included in the inventions described in the claims and the scope of equivalents of the inventions.

What is claimed is:

1. A non-contact power receiving device magnetic sheet comprising:
    at least one magnetic thin strip having a composition presented by a general formula $Fe_{100-a-b-c}M_aX_bT_c$ wherein M is at least one element selected from the group consisting of Ni and Co, T is at least one element selected from the group consisting of Mn, Cr, Ti, Zr, Hf, Mo, V, Nb, W, Ta, Cu, Sn and rare-earth elements, X is at least one element selected from the group consisting of B, Si, C and P, a is a number satisfying $0 \leq a \leq 25$ atom %, b is a number satisfying $10 \leq b \leq 35$ atom %, and c is a number satisfying $0 \leq c \leq 5$ atom %,
    wherein said at least one magnetic thin strip is not subjected to heat treatment, and said at least one magnetic thin strip that is not subjected to the heat treatment has a saturation magnetostriction constant of 15 ppm or more, and
    wherein an L value of said magnetic sheet is 11 µH or more under 125 kHz and a Q value of magnetic sheet is from 10 to 13.5 under 125 kHz.

2. The non-contact power receiving device magnetic sheet of claim 1, wherein the magnetic sheet comprises a plurality of the magnetic thin strips, and said magnetic thin strips are stacked with resin film parts alternately.

3. The non-contact power receiving device magnetic sheet of claim 2, wherein the stacked magnetic thin strips have a thickness that is from 5 to 30 µm.

4. The non-contact power receiving device magnetic sheet of claim 1, wherein the at least one magnetic thin strip has a saturation magnetic flux density that is from 1.2 to 2.1 T.

5. The non-contact power receiving device magnetic sheet of claim 1, wherein the magnetic sheet comprises a plurality of the magnetic thin strips which are positioned laterally adjacent each other, but with a contact region extending between the magnetic thin strips.

6. The non-contact power receiving device magnetic sheet of claim 1, wherein the at least one magnetic thin strip is provided with cut-out portions separating the at least one magnetic thin strip into laterally adjacent portions that are coupled together by contact regions extending across the cut-out portions.

7. The non-contact power receiving device magnetic sheet of claim 6, wherein a ratio (B/A) of a total length B of the cut-out portions to a total outer peripheral length A of the at least one magnetic thin strip is from 2 to 25.

8. The non-contact power receiving device magnetic sheet of claim 6, wherein the at least one magnetic thin strip is provided with cut-out portions and a ratio (B/A) of a total length B of the cut-out portions to a total outer peripheral length A of the at least one magnetic thin strip is in a range from 6.8 to 16.8.

9. A non-contact power receiving device, comprising:
    a power receiving coil having a spiral coil;
    a rectifier rectifying an alternating voltage generated in the power receiving coil;
    a secondary battery to which a direct-current voltage rectified in the rectifier is charged; and
    the magnetic sheet of claim 1 arranged in at least one of a position between the spiral coil and the secondary battery, and a position between the spiral coil and the rectifier.

10. An electronic apparatus, comprising:

a non-contact power receiving device including a power receiving coil having a spiral coil, a rectifier rectifying an alternating voltage generated in the power receiving coil, and a secondary battery to which a direct-current voltage rectified in the rectifier is charged;

an electronic apparatus main body including an electronic device supplied with the direct-current voltage from the secondary battery for operation, and a circuit board on which the electronic device is mounted; and the magnetic sheet of claim 1 arranged in at least one of a position between the spiral coil and the secondary battery, a position between the spiral coil and the rectifier, a position between the spiral coil and the electronic device, and a position between the spiral coil and the circuit board.

11. A non-contact charging system, comprising:

the electronic apparatus according to claim 10; and a power feeding device including a power feeding coil arranged in a non-contact manner with respect to the power receiving coil of the electronic apparatus, a power supply applying an alternating voltage to the power feeding coil, and a magnet positioning the electronic apparatus relative to the power receiving device where magnetic flux generated in the power feeding coil transmits power in a non-contact manner to the power receiving coil.

12. The non-contact charging system of claim 11, wherein the magnetic sheet is arranged as at least one of a magnetic shield and an inductor.

\* \* \* \* \*